(12) United States Patent
Zhu et al.

(10) Patent No.: US 10,277,416 B2
(45) Date of Patent: Apr. 30, 2019

(54) SERVICE CONTINUITY FOR GROUP COMMUNICATIONS OVER EVOLVED MULTIMEDIA BROADCAST MULTICAST SERVICE

(71) Applicant: QUALCOMM Incorporated, San Diego, CA (US)

(72) Inventors: Xipeng Zhu, Beijing (CN); Jun Wang, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 15/023,635

(22) PCT Filed: Oct. 23, 2014

(86) PCT No.: PCT/CN2014/089276
§ 371 (c)(1),
(2) Date: Mar. 21, 2016

(87) PCT Pub. No.: WO2015/062443
PCT Pub. Date: May 7, 2015

(65) Prior Publication Data
US 2016/0211980 A1    Jul. 21, 2016

(30) Foreign Application Priority Data

Oct. 30, 2013   (WO) ................ PCT/CN2013/086216

(51) Int. Cl.
*H04L 12/18*      (2006.01)
*H04W 4/06*      (2009.01)
(Continued)

(52) U.S. Cl.
CPC ............. *H04L 12/189* (2013.01); *H04W 4/06* (2013.01); *H04W 4/08* (2013.01); *H04W 36/26* (2013.01); *H04W 72/005* (2013.01)

(58) Field of Classification Search
None
See application file for complete search history.

(56) References Cited

U.S. PATENT DOCUMENTS 9,883,355 B2 *   1/2018  Lee .......................... H04W 4/08
2008/0268878 A1  10/2008  Wang et al.
(Continued)

FOREIGN PATENT DOCUMENTS

CN       101237668 A     8/2008
CN       101370239 A     2/2009
(Continued)

OTHER PUBLICATIONS

International Search Report and Written Opinion—PCT/CN2013/086216—ISA/EPO—dated Aug. 11, 2014.
(Continued)

*Primary Examiner* — Alex Skripnikov
(74) *Attorney, Agent, or Firm* — Arent Fox, LLP

(57) ABSTRACT

A UE maintains continuity of reception of a service of interest that is available over eMBMS broadcast service and unicast. The UE receives the service of interest over eMBMS from a network within a first MBSFN area supporting the eMBMS broadcast service. The UE receives at least one MBSFN threshold from the network and at least one MBSFN measurement from the network. The UE switches from reception of the eMBMS broadcast from the first MBSFN area to one of reception through unicast or reception through a second MBSFN area supporting the
(Continued)

eMBMS broadcast service, based on the at least one MBSFN threshold and the at least one MBSFN measurement.

29 Claims, 19 Drawing Sheets

(51) Int. Cl.
*H04W 72/00* (2009.01)
*H04W 4/08* (2009.01)
*H04W 36/26* (2009.01)

(56) References Cited

U.S. PATENT DOCUMENTS

| | | |
|---|---|---|
| 2011/0081854 A1 | 4/2011 | Kuo et al. |
| 2011/0256824 A1 | 10/2011 | Futaki et al. |
| 2013/0051298 A1 | 2/2013 | Drevoe |
| 2013/0083715 A1* | 4/2013 | Etemad ............... H04W 52/04 370/312 |
| 2013/0128756 A1 | 5/2013 | Zhang et al. |
| 2013/0229974 A1 | 9/2013 | Xu et al. |
| 2014/0036676 A1* | 2/2014 | Purnadi ............ H04W 36/0055 370/235 |
| 2014/0073316 A1* | 3/2014 | Farnham ............... H04W 24/08 455/423 |
| 2014/0242993 A1* | 8/2014 | Dahlen ............ H04W 36/0083 455/436 |

FOREIGN PATENT DOCUMENTS

| | | |
|---|---|---|
| CN | 102075867 A | 5/2011 |
| CN | 102448019 A | 5/2012 |
| CN | 102685684 A | 9/2012 |
| CN | 102740233 A | 10/2012 |
| EP | 1650989 A1 | 4/2006 |
| EP | 2809092 A1 | 12/2014 |
| ES | 2410570 T3 | 7/2013 |
| JP | 2011518465 A | 6/2011 |
| WO | 2008046347 A1 | 4/2008 |
| WO | 2008134554 A2 | 11/2008 |
| WO | 2010073701 A1 | 7/2010 |
| WO | 2013111887 A1 | 8/2013 |

OTHER PUBLICATIONS

International Search Report and Written Opinion—PCT/CN2014/089276—ISA/EPO—dated Feb. 3, 2015.
Supplementary European Search Report—EP14858412—Search Authority—Munich—dated May 8, 2017.

* cited by examiner

SERVICE CONTINUITY FOR GROUP COMMUNICATIONS OVER EVOLVED MULTIMEDIA BROADCAST MULTICAST SERVICE

CROSS-REFERENCE TO RELATED APPLICATION(S)

This application claims the benefit of PCT International Application Serial No. PCT/CN2014/089276, entitled "Service Continuity For Group Communications Over Evolved Multimedia Broadcast Multicast Service" and filed on Oct. 23, 2014, which claims priority of PCT International Application Serial No. PCT/CN2013/086216, entitled "Service Continuity For Group Communications Over Evolved Multimedia Broadcast Multicast Service" and filed on Oct. 30, 2013, which are expressly incorporated by reference herein in their entirety.

BACKGROUND

Field

The present disclosure relates generally to communication systems, and more particularly, to service continuity for group communications over evolved multimedia broadcast multicast service (eMBMS).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Methods, apparatuses, and computer program products for maintaining continuity of a service of interest, such as group communications, are disclosed. In one aspect, the apparatus may be a UE. A UE maintains continuity of reception of a service of interest that is available over eMBMS broadcast service and unicast. The UE receives the service of interest over eMBMS from a network within a first MBSFN area supporting the eMBMS broadcast service. The UE receives at least one MBSFN threshold from the network and at least one MBSFN measurement from the network. The UE switches from reception of the eMBMS broadcast from the first MBSFN area to one of reception through unicast or reception through a second MBSFN area supporting the eMBMS broadcast service, based on the at least one MBSFN threshold and the at least one MBSFN measurement.

In another aspect, the apparatus may be part of a network within a first MBSFN area supporting the eMBMS broadcast service. For example, the network element may be a base station. The base station receives at least one parameter from the UE and determines whether the UE should switch from reception of the eMBMS broadcast from the first MBSFN area to reception through unicast, based on the at least one parameter. Upon determining that the UE should switch to unicast reception, the base station indicates to the UE to switch to reception through unicast.

DETAILED DESCRIPTION

Figure 1:
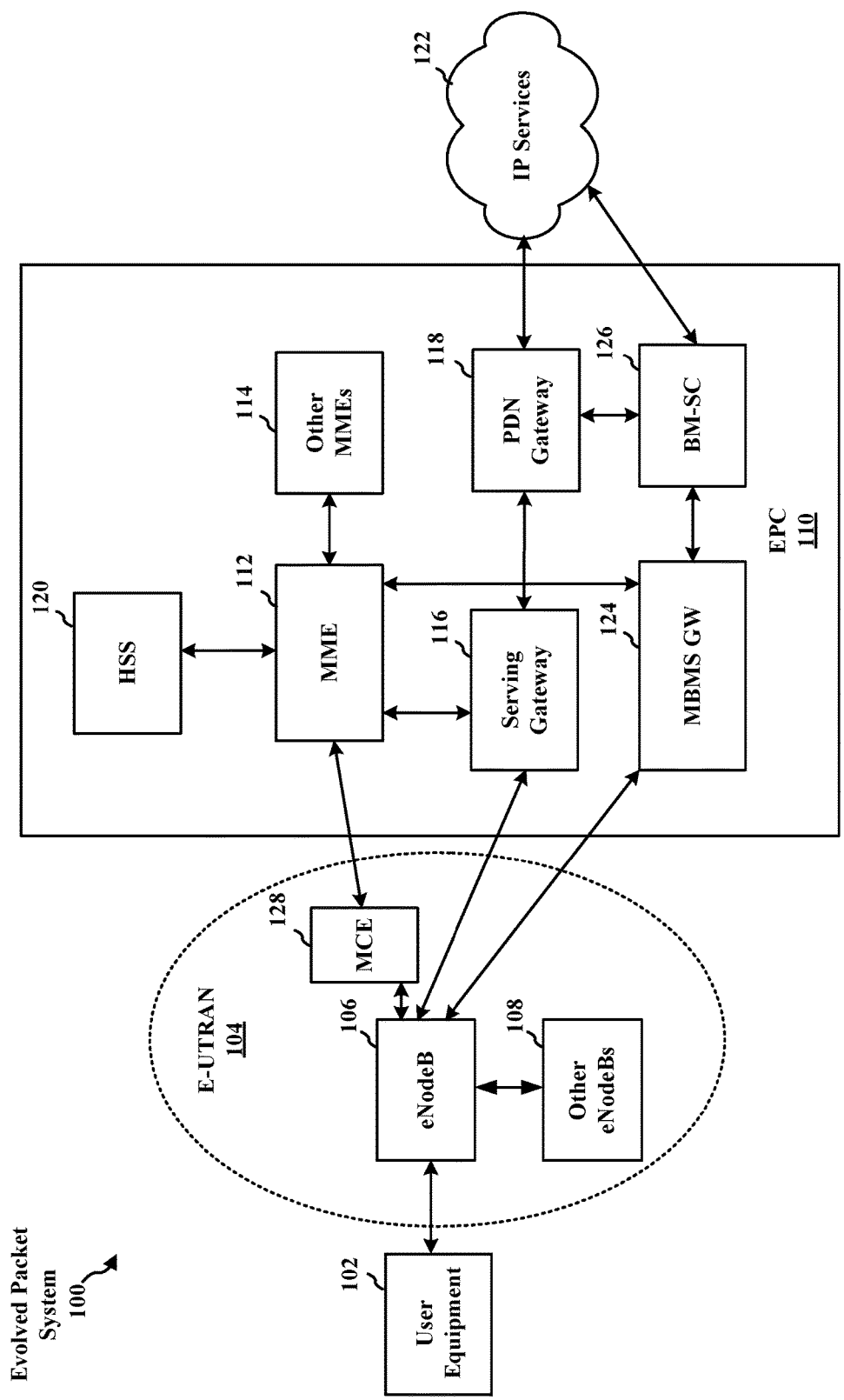
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
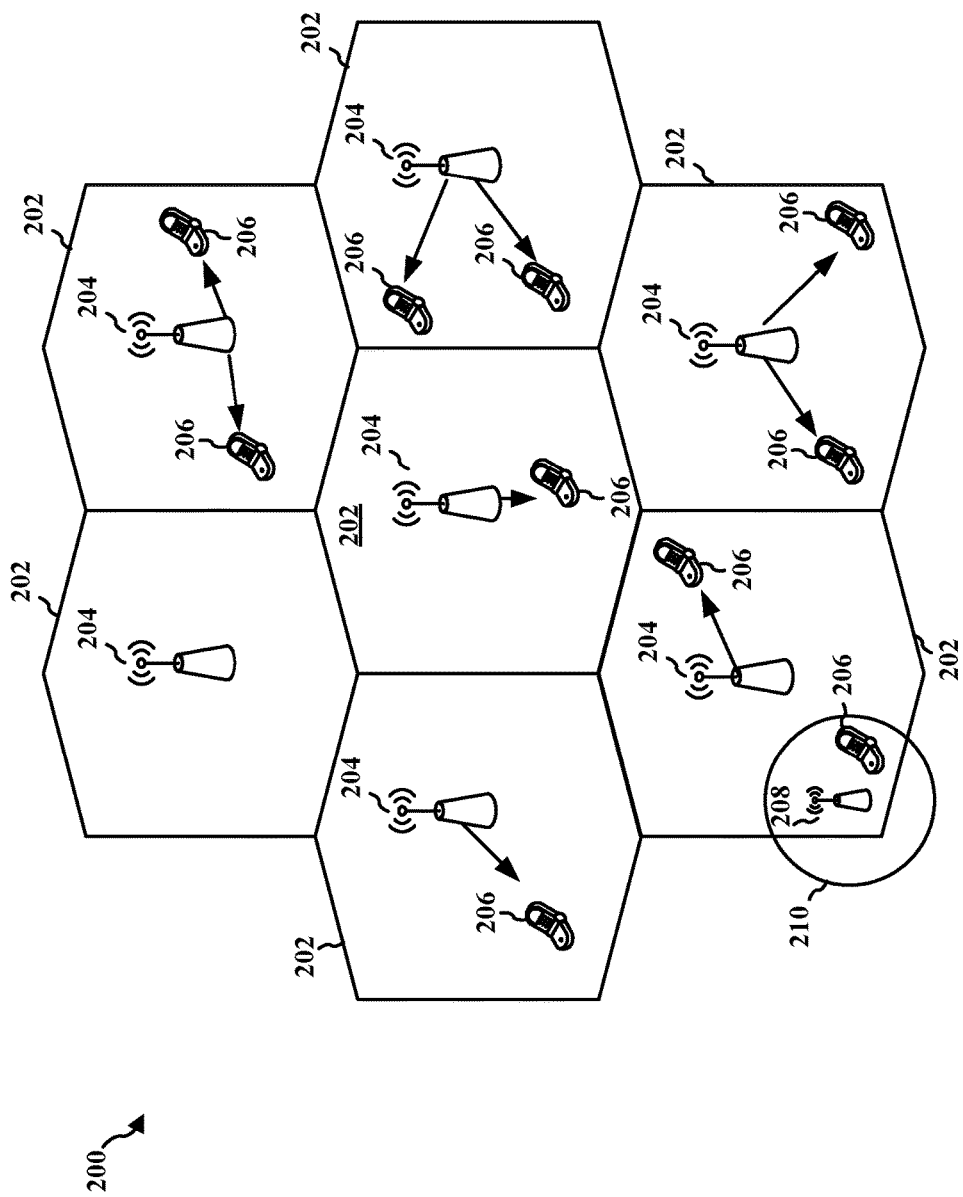
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
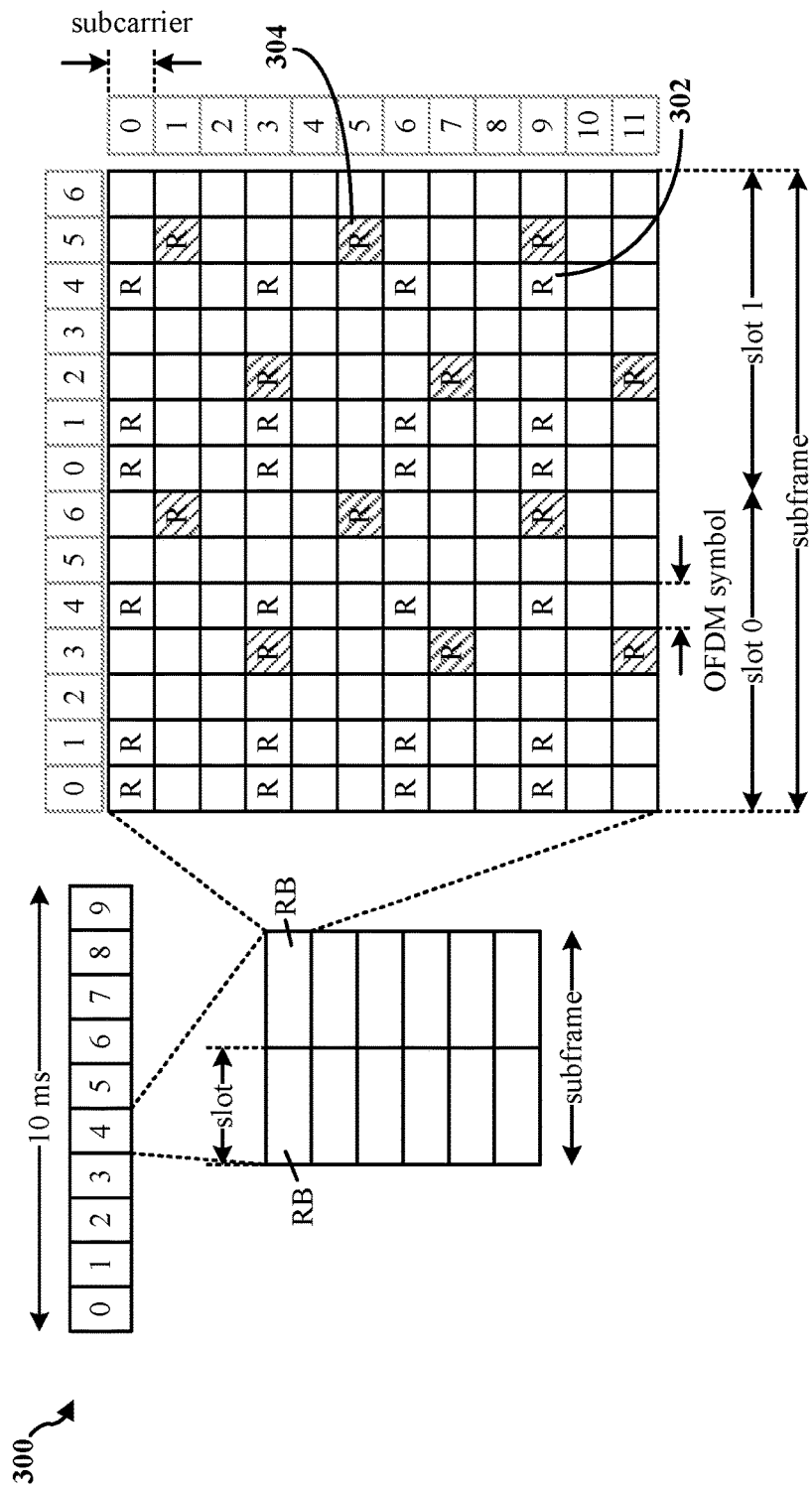
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
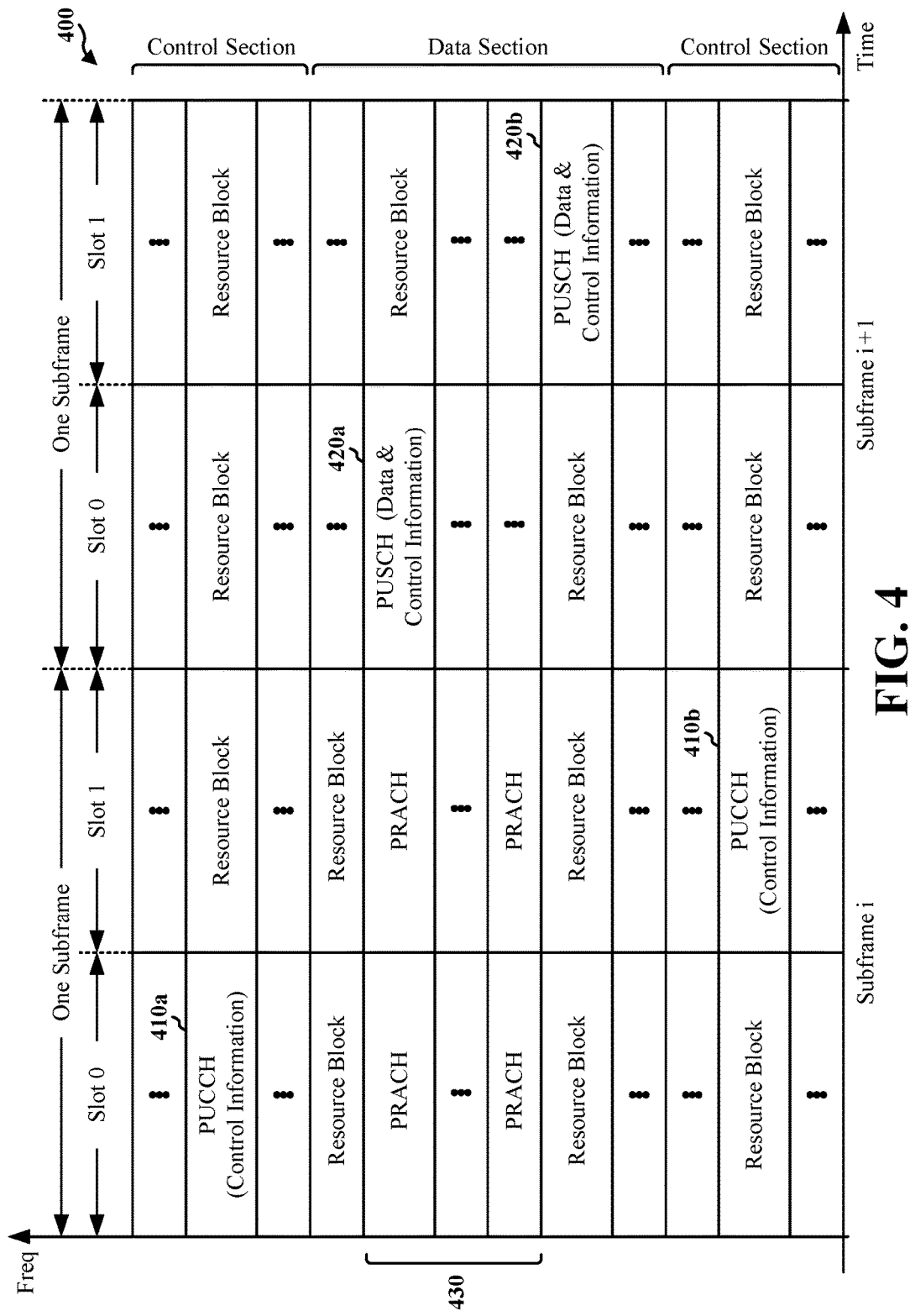
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
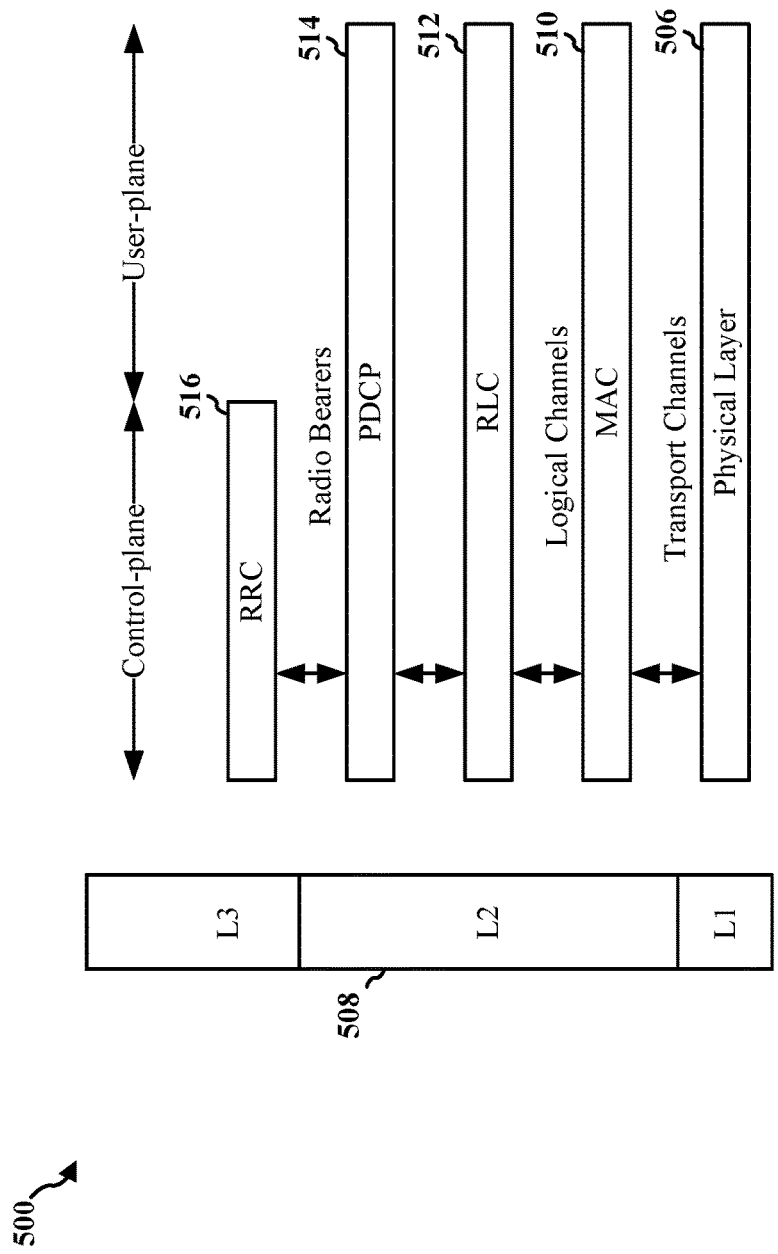
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
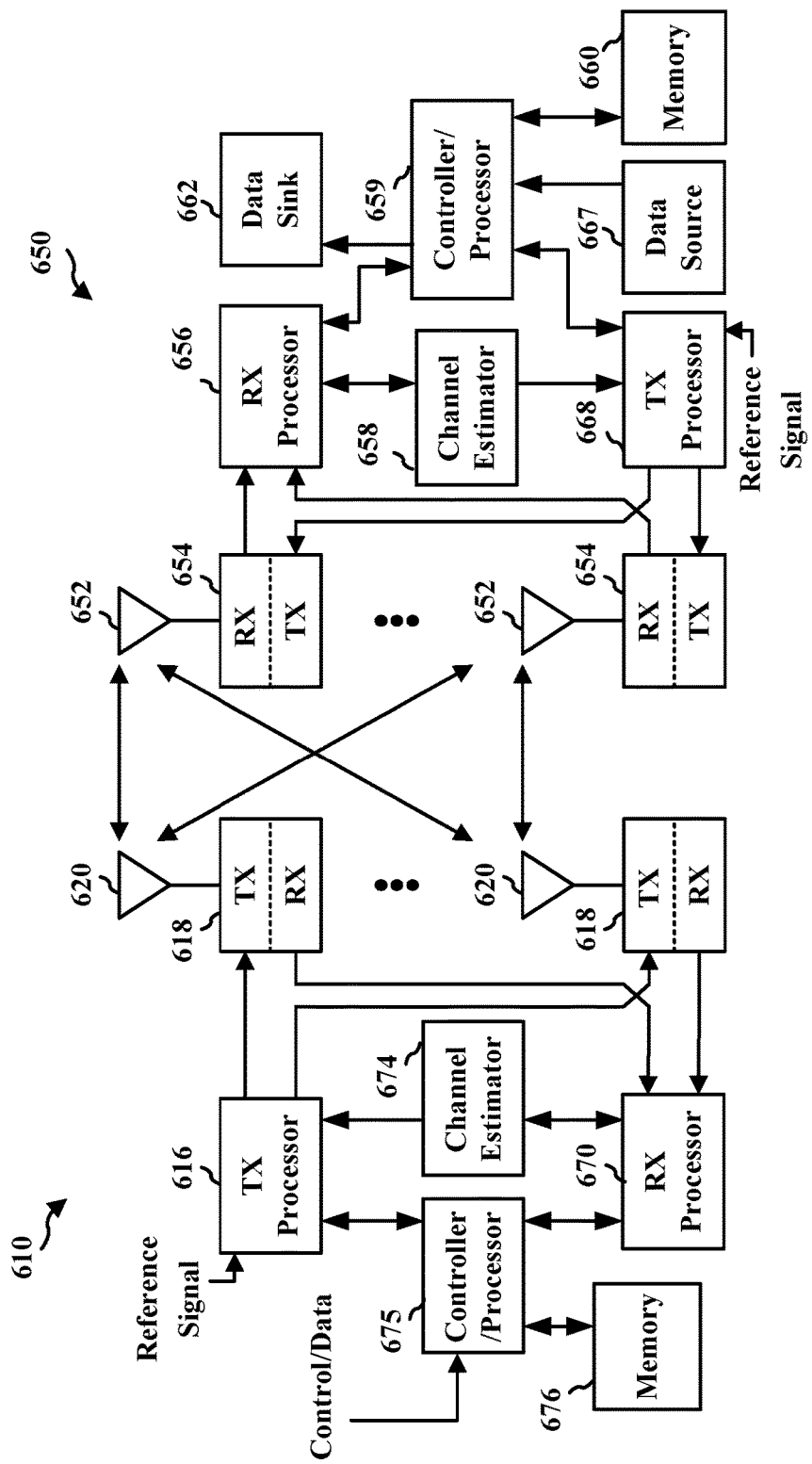
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figures 7A, 7B:
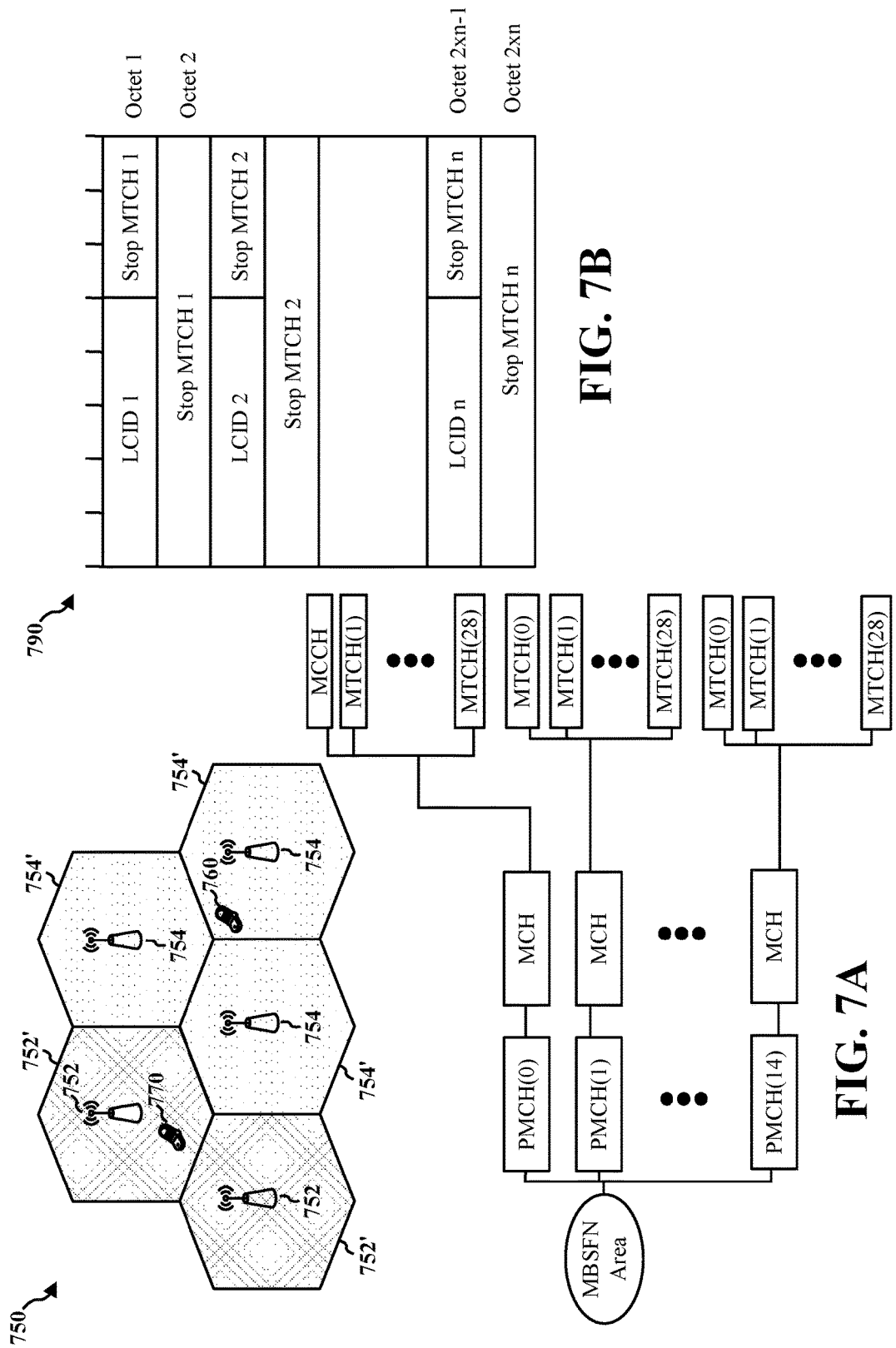
FIG. 7A is a diagram illustrating an example of an evolved Multimedia Broadcast Multicast Service channel configuration in a Multicast Broadcast Single Frequency Network.
FIG. 7B is a diagram illustrating a format of a Multicast Channel Scheduling Information Media Access Control control element.

FIG. 7A is a diagram 750 illustrating an example of an evolved MBMS (eMBMS) channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast.

Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. In a first step, the UE may acquire a system information block (SIB) 13 (SIB13). In a second step, based on the SIB13, the UE may acquire an MBSFN Area Configuration message on an MCCH. In a third step, based on the MBSFN Area Configuration message, the UE may acquire an MCH scheduling information (MSI) MAC control element. The SIB13 may indicate (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

Figure 8:
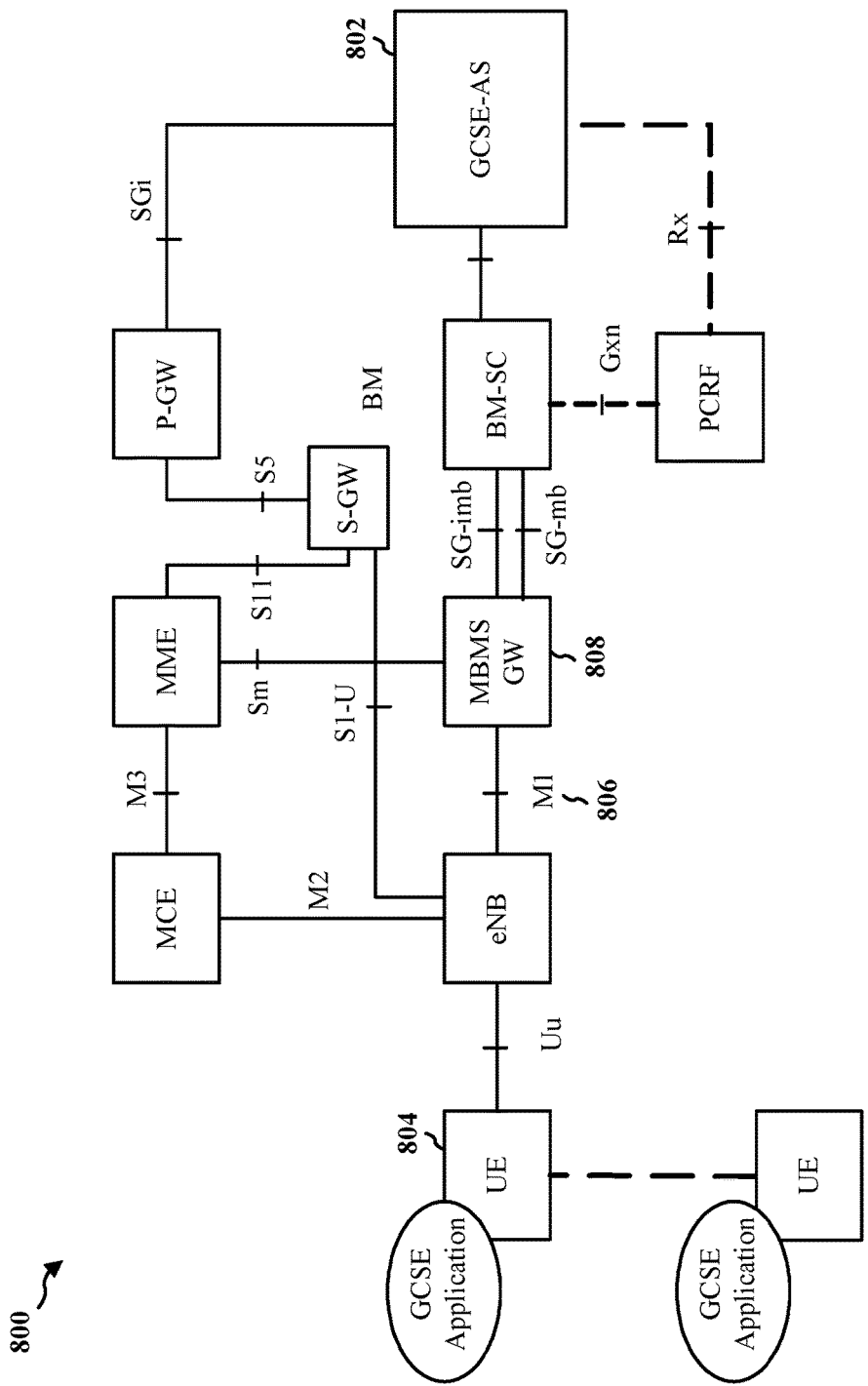
FIG. 8 is a diagram illustrating an example of a network architecture including a group communication system enabler application server (GCSE-AS).

FIG. 8 is a diagram 800 illustrating an example of a network architecture including a group communication system enabler application server (GCSE-AS) 802. A GCSE-AS 802 is a 3GPP feature enabling an application layer functionality to provide group communication service over E-UTRAN. A group communication service is intended to provide a fast and efficient mechanism to distribute the same content to multiple users in a controlled manner through "group communication." Group communication corresponds to communication from transmitter group members to receiver group members. A "transmitter group member" is a group member of a GCSE group that is authorized to transmit ongoing or future group communications for that GCSE group. A "receiver group member" is a group member of a GCSE group that has expressed interest in receiving ongoing or future group communications of that GCSE group. As an example, the concept of group communications may be used in the operation of classical Land Mobile Radio (LMR) systems for, but not limited to, public safety organizations.

Group communication may have three service continuity scenarios. In a first scenario, referred to as a broadcast (BC) to unicast (UC) scenario, a UE is moving out of broadcast, e.g., eMBMS, coverage of a group communication which may be identified by a temporary mobile group identity (TMGI). In the BC-to-UC scenario, the UE may be switched to a unicast, e.g., EPS, bearer in order to continue receiving group communication.

In a second scenario, referred to as a BC-to-BC scenario, a UE moves from a first eMBMS cell to a second eMBMS cell. In this scenario, in order to continue receiving group communications, the UE may be switched from a first MBSFN area supporting the eMBMS to a second MBSFN area supporting the eMBMS. The first eMBMS cell and the second eMBMS cell may be part of the same eMBMS service area or they may be part of different eMBMS service areas. In one possible scenario, a same TMGI for the group call may be served by both MBSFN area 1 and MBSFN area 2, which are included in the same MBMS service area identified by the same SAI. In another possible scenario, a same TMGI for the group call may be served by both MBSFN area 1 and MBSFN area 2, which are included in the same MBMS service area identified by different SAIs, e.g., MBSFN 1 in SAI1 and MBSFN 2 in SAI2. In yet another possible scenario, a same TMGI for the group call may be served by both MBSFN area 1 and MBSFN area 2, which are included in the different MBMS service areas identified by different SATs, e.g., MBSFN 1 in SAI1 and MBSFN 2 in SAI2.

Figure 9:
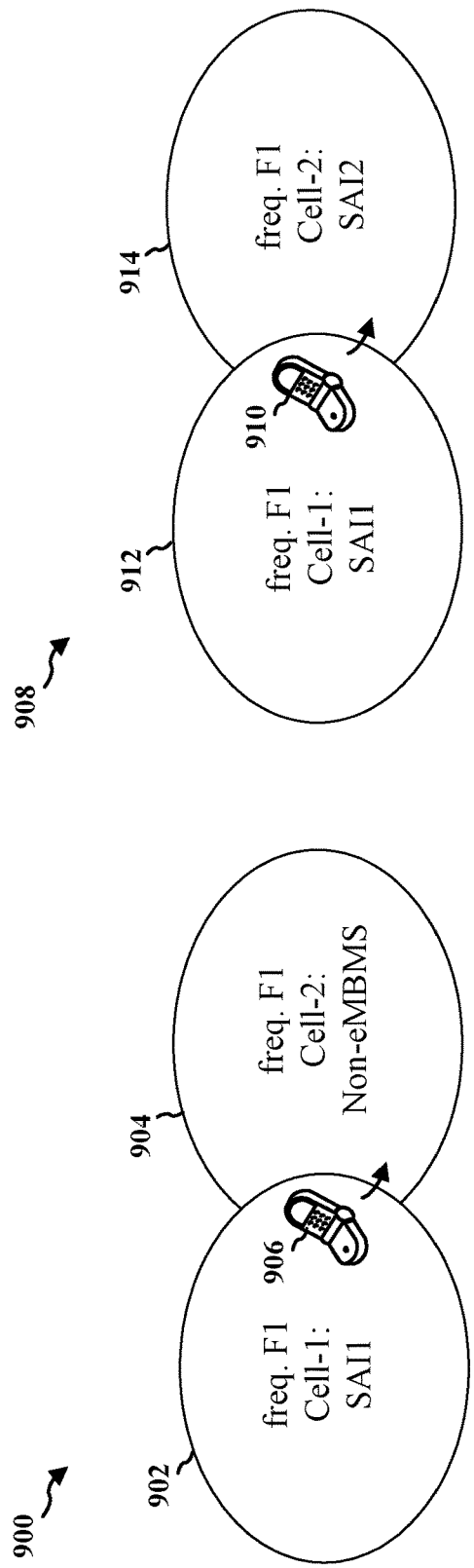
FIG. 9A is a diagram illustrating a first case of a broadcast to broadcast scenario wherein a same frequency is used for both an eMBMS cell and a non-eMBMS cell.
FIG. 9B is a diagram illustrating a second case of a broadcast-to-broadcast scenario wherein a same frequency is used for different eMBMS service.

FIG. 9A is a diagram 900 illustrating a first case of a BC-to-BC scenario wherein a same frequency F1 is used for both an eMBMS cell 902 and a non-eMBMS cell 904. In this case, a UE 906 is moving from the first eMBMS cell 902 transmitting eMBMS services associated with service area identification (SAI) 1 on a frequency F1, to a second cell 904 transmitting non-eMBMS services on the same frequency F1.

FIG. 9B is a diagram 908 illustrating a second case of a BC-to-BC scenario wherein a same frequency is used for different eMBMS services. In this case, a UE 910 is moving from a first eMBMS cell 912 transmitting an eMBMS service associated with service area identification (SAI) 1 on a frequency F1, to a second eMBMS cell 914 transmitting another eMBMS service associated with service area identification (SAI) 2 on a frequency F1.

In a third scenario, referred to as a UC-to-BC scenario, a UE is moving into a broadcast coverage area of a group communication service. In the UC-to-BC scenario, the UE may be switched to a broadcast, e.g., eMBMS, bearer in order to continue receiving the group communication.

Disclosed herein are improvements for BC-to-UC service continuity for group communications. Improvements for BC-to-BC service continuity for group communications are also disclosed.

Figure 10:
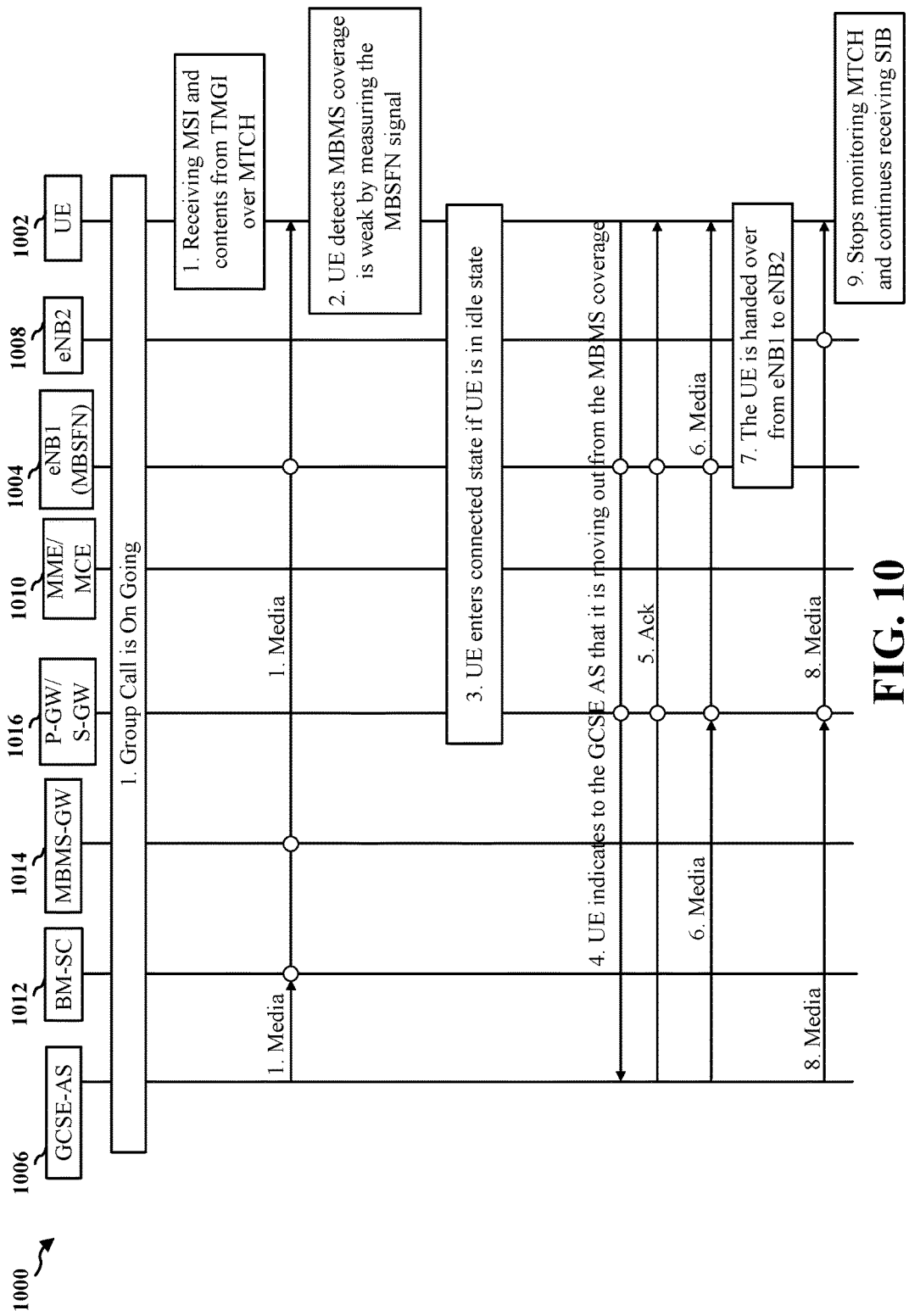
FIG. 10 is a call flow diagram illustrating a baseline solution for BC-to-UC service continuity when a UE is moving out of eMBMS coverage.

BC-to-UC Switching Scenario:

As previously described, in a BC-to-UC switching scenario, a UE is moving out of broadcast, e.g., eMBMS, coverage. In the BC-to-UC scenario, the UE may be switched to a unicast, e.g., EPS, bearer in order to continue receiving group communication FIG. 10 is a call flow diagram 1000 illustrating a baseline solution for BC-to-UC service continuity when a UE 1002 is moving out of an eMBMS coverage area providing a group communication. In step 1, the group communication (GC) call is ongoing. The UE 1002 is being served by eNB1 1004 of an MBSFN area supporting an eMBMS service broadcasting the group communication. As part of step 1, the UE 1002 receives the group communication service data/media from the content provider, e.g., the GCSE-AS 1006, via an eMBMS bearer service. The data/media is received at the UE 1002 through signaling from the GCSE-AS 1006 to the BM-SC 1012, to the MBMS-GW 1014 to the eNB1 1004.

In step 2, for make-before-break switching procedures, the UE 1002 detects that the UE is about to move out of the coverage area of the MBSFN area supporting the eMBMS service of the group communication. For example, the UE 1002 may detect that the eMBMS coverage is weak based on a measured signal strength that is marginal or below an acceptable threshold. The UE 1002 may detect such movement through one or more of the following implementation-specific methods. The UE may detect that the strength of the MBSFN signals being received from eNBs participating in MBSFN has fallen below a threshold. For example, the UE may determine one or more of a MBSFN receiver signal received power (MBSFN RSRP) threshold, a MBSFN reference signal received quality (MBSFN RSRQ) threshold, a MBSFN signal-to-interference-plus-noise ratio (MBSFN SINR) threshold, and a multicast channel of MBMS (MCH) block error rate (MCH BLER) threshold based on an MCS configuration indicated in the MCCH. The UE 1002 may also detect such movement when the UE detects that the packet data loss rate associated with signals received from the eNB1 1004 is increased or exceeds a certain loss rate.

In step 3, upon detecting weak eMBMS coverage when the UE is in an idle state, the UE 1002 enters the connected state by performing RRC connection procedures with the current serving eNB (e.g., eNB1). In step 4, the UE 1002 indicates to the GCSE-AS 1006 that the UE has moved out of the eMBMS coverage area. The indication may be provided through application signaling through the eNB1 1004 and the P-GW/S-GW 1016.

In step 5, the GSCE-AS 1006 sends an ACK to the UE 1002 through application signaling through the P-GW/S-GW 1016 and the eNB1 1004. In step 6, the UE 1002 receives the GC service data/media from the GCSE-AS 1006 via a unicast bearer through eNB1 1004.

In step 7, the UE 1002 is handed over from eNB1 1004 to eNB2 1008. The eNB2 1008, however, is not associated with the MBSFN area supporting an eMBMS service broadcasting the group communication. Accordingly, in step 8, the UE 1002 receives the GC service data/media from GCSE- AS 1006 via a unicast bearer through eNB2 1008. In step 9, the UE 1002 stops monitoring the MTCH associated with the eMBMS service, but continues receiving SIBs for the purpose of detecting the availability of MBMS bearers.

To further improve the service continuity performance of the baseline solution of FIG. 10, some optimizations can be performed. In one optimization, additional criteria for use by the UE 1002 in detecting weak eMBMS coverage and determining to switch to unicast may be provided by the network to the UE. In another optimization, the decision to switch the UE 1002 from broadcast to unicast is performed by an eNB.

BC-to-UC Switching—Decision at UE:

In this optimization, the network may send one or more of the following threshold parameters to the UE 1002 as assistance information for making a switching decision. These thresholds are used in addition to the thresholds used in step 2 of the baseline approach of FIG. 10. In one implementation, the UE 1002 makes a preliminary decision based on the thresholds of step 2 and one or more confirming decisions based on the assistance information.

MBSFN RSRP/RSRQ/SINR/BLER Threshold for Switching Preparation:

The MCE 1010 or eNB 1004 may send a MBSFN RSRP/RSRQ/SINR/BLER threshold to UE 1002 for purposes of switching preparation. In this optimization, the UE assistance information may include one or more of a first MBSFN RSRP/RSRQ threshold, a first MBSFN SINR threshold and a first MCH BLER threshold or modulation coding scheme (MCS) that are used by the UE 1002 to prepare for switching from broadcast reception mode to unicast reception mode of the group communication. When any of the MBSFN RSRP/RSRQ/SINR measurements fall below the respective associated first threshold, or when the MCH BLER measurement exceeds the respective associated first threshold, the UE 1002 enters RRC CONNECTED state (as show in step 3 of FIG. 10) when the UE is in an RRC IDLE state.

MBSFN RSRP/RSRQ/SINR/BLER Threshold to Initiate BC-UC Switching.

The MCE 1010 or eNB 1004 may send a MBSFN RSRP/RSRQ/SINR/BLER threshold to the UE 1002 for purposes of initiating BC-UC switching. In this optimization, the UE assistance information may further include one or more of a second MBSFN RSRP/RSRQ threshold, a second MBSFN SINR threshold and a second MCH BLER threshold that are used by the UE to initiate BC-to-UC switching. These second thresholds may be used after the UE has entered a RRC CONNECTED state based on the above-described first thresholds. The second MBSFN RSRP/RSRQ threshold and a second MBSFN SINR threshold may be less than their respective first thresholds, while the second MCH BLER threshold may be greater than the respective first threshold.

When any of the MBSFN RSRP/RSRQ measurements or MBSFN SINR measurements falls below the respective second threshold, or the MCH BLER measurement exceeds the second threshold, the UE 1002 sends an indication to the anchor node, e.g. GCSE-AS 1006 (as shown in step 4 of FIG. 10) requesting data/media delivery over unicast.

As noted above, the second MBSFN RSRP/RSRQ/SINR threshold is normally lower than the first threshold and the second MCH BLER threshold is normally higher than the first threshold. These differences between first and second thresholds may provide some protection time for the UE 1002 to perform switching while avoiding ping-ponging between UC and BC reception modes. The first and second thresholds can be per MBSFN area, per cell, or per PMCH based.

The MCE 1010 can determine the first and second MBSFN RSRP/RSRQ/SINR/BLER thresholds and send them to all eNBs 1004 in an MBSFN area. The eNBs in turn, send the thresholds to the UE 1002. The thresholds can be sent on the MCCH, as part of the information of a SIB, or sent via RRC dedicated signaling. The eNB 1004 may change the threshold per that eNB's local coverage status. The UE or the network can have a mapping table of signal-to-noise (SNR) and MCS if MCS is used to indicate threshold to the UE.

Figure 11:
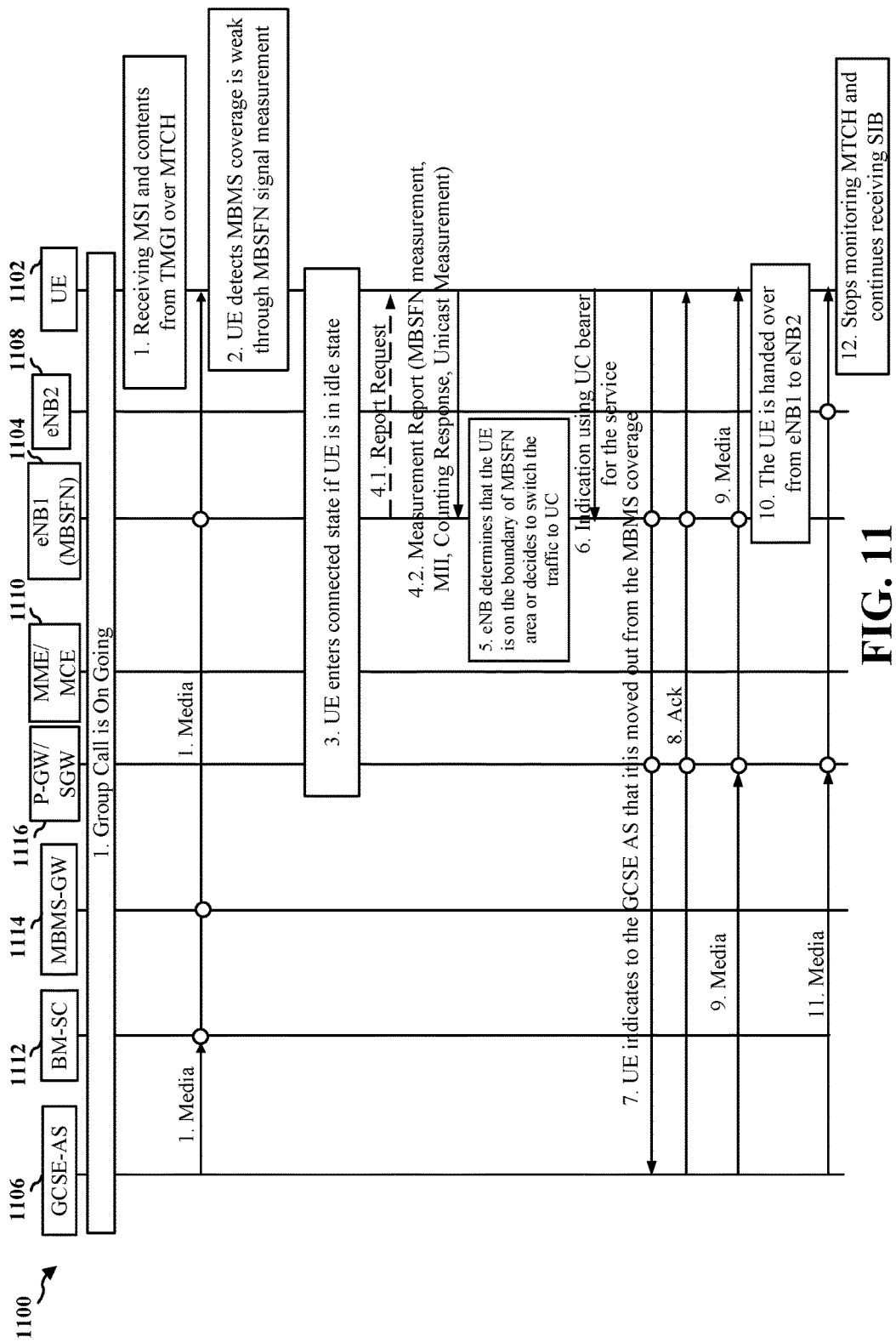
FIG. 11 is a call flow diagram illustrating a make-before-break, UE-assisted network based solution for maintaining service continuity when moving out of eMBMS coverage.

BC-to-UC Switching with Decision at eNB:

In the baseline solution of FIG. 10, the switching decision is made by the UE. The eNB may, however, have additional information that can improve the group communication switching decisions. For example, the eNB may have: a counting result, measurement reports of MBSFN and/or unicast signal strength, and MBSFN coverage area information. Accordingly, optimizations presented below include UE group communication switching decisions that are either partially or fully made at the network level, for example, by an eNB.

eNB Sends Indication/Command for a UE to Switch from BC to UC:

FIG. 11 is a call flow diagram 1100 illustrating a make-before-break UE-assisted network based solution for maintaining service continuity when a UE is moving out of eMBMS coverage for a group communication. In a UE-assisted solution, the eNB informs the UE to initiate switching from BC-to-UC reception mode.

In step 1 the group communication call is ongoing. The UE 1102 is being served by eNB1 1104 of an MBSFN area supporting an eMBMS service broadcasting the group communication. As part of step 1, the UE 1102 receives the group communication service data/media from the content provider, e.g., the GCSE-AS 1106, via an eMBMS bearer service. The data/media is received at the UE 1102 through signaling from the GCSE-AS 1106 to the BM-SC 1112, to the MBMS-GW 1114 to the eNB1 1104.

In step 2, for make-before-break switching procedures, the UE 1102 detects that the UE is about to move out of the MBSFN coverage area supporting the eMBMS broadcast service of the group communication. For example, the UE 1102 may detect that the eMBMS signal is weak. The UE 1102 may detect that the UE is moving outside of the eMBMS coverage area of the group communication through one or more of the following implementation-specific methods. The UE 1102 may detect that the strength of the MBSFN signals being received have become weak and fallen below a threshold. For example, the UE 1102 may determine MBSFN RSRP/RSRQ/SINR/BLER thresholds based on the MCS configuration indicated in the corresponding MCCH to initiate switching procedures. The UE 1102 may also detect moving outside of the coverage area (or at the boundary of the coverage area) by detecting that the packet data loss rate associated with eMBMS group communication signals increases above a threshold.

In step 3, upon detecting weak eMBMS coverage when the UE 1102 is in idle state, the UE 1102 enters the connected state by performing RRC connection procedures with the serving eNB 1104 (e.g., eNB1).

In step 4.2, the UE 1102 may autonomously send a report to the serving eNB 1104 which may include MBMS interest indication (MID, a counting response, an MBSFN or unicast measurement report. Alternatively, in step 4.1, the UE 1102 may receive a report request from the serving eNB1 1104 that triggers the UE to send a counting response, an MBSFN or unicast measurement report based on MII received from the UE. Alternatively, the network, e.g., eNB1, may trigger the UE 1104 to send MII, a counting response, an MBSFN or unicast measurement by sending a request once the eNB detects that the UE has entered the RRC CONNECTED state.

In step 5, the eNB1 1104 determines that the UE 1102 should switch from broadcast to unicast based on the report sent by the UE. For example, based on the information transmitted by the UE 1102, the eNB1 1104 may detect that the UE is at the boundary of the MBSFN area supporting the eMBMS service broadcasting the group communication. In step 6, the eNB1 1104 indicates to the UE 1102 to use the unicast channel for the group communication service.

In step 7, the UE 1102 indicates to the GCSE-AS 1106 that the UE has moved out of the eMBMS coverage area of the group communication. The indication may be provided through application signaling through the eNB1 1104 and the P-GW/S-GW 1116

In step 8, the GSCE-AS 1106 sends an ACK to the UE 1102 through application signaling through the P-GW/S-GW 1116 and the eNB1 1104. In step 9, the UE 1102 receives the GC service data/media from the GCSE-AS via the unicast bearer through eNB1 1104.

In step 10, the UE 1102 is handed over from eNB1 1104 to eNB2 1108. The eNB2 1108, however, is not an eNB of the MBSFN area supporting the group communication over an eMBMS broadcast service. Accordingly, in step 11, the UE 1102 receives the GC service data/media from GCSE-AS via the unicast bearer through eNB2 1108. In step 12, the UE 1108 stops monitoring the MTCH associated with the group communication carried via eMBMS and continues receiving SIBs.

Figure 12:
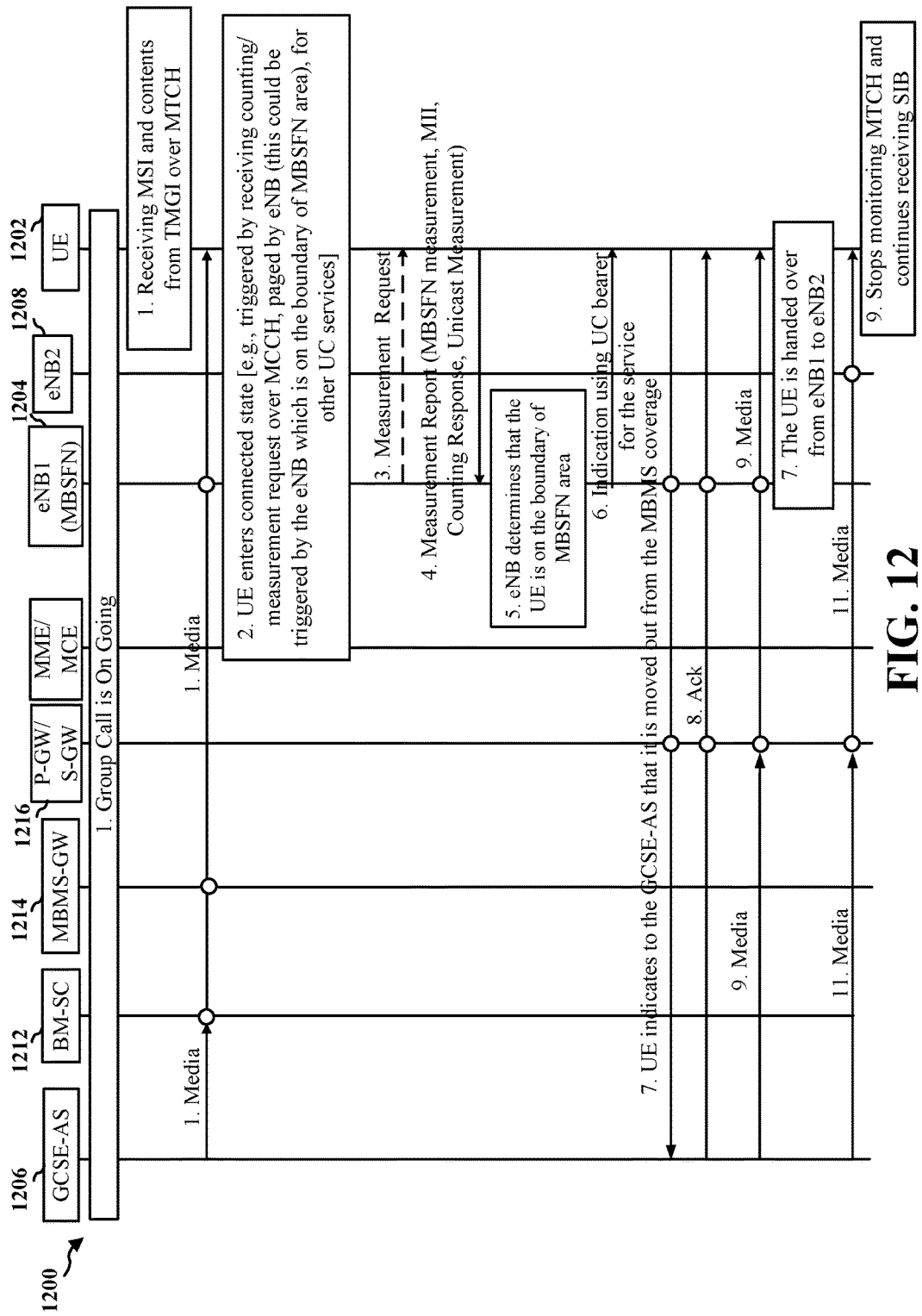
FIG. 12 is a call flow diagram illustrating a make-before-break, full network based solution for maintaining service continuity when moving out of eMBMS coverage.

FIG. 12 is a call flow diagram 1200 illustrating a make-before-break, full network based solution for maintaining service continuity when a UE is moving out of eMBMS coverage.

In step 1 the group communication call over eMBMS is ongoing. The UE 1202 is being served by eNB1 1204 of an MBSFN area supporting an eMBMS service broadcasting the group communication. The UE 1202 receives the group communication service data/media from the content provider, e.g., the GCSE-AS 1206, via an eMBMS bearer service. The data/media is received at the UE 1002 through signaling from the GCSE-AS 1006 to the BM-SC 1012, to the MBMS-GW 1014 to the eNB1 1004.

In step 2, the eNB 1204 triggers UEs, including UE 1202, to enter the connected state. Triggering may involve, for example, one or more of the following: An eNB at the boundary of the MBSFN area sends SIB to indicate to the UEs to enter the connected state. An eNB at the boundary of the MBSFN area sends counting request or measurement request over MCCH. An eNB sends paging message to the UEs to indicate that the UE located in Cell ID x should enter connected state. An eNB sends a paging message to specific UEs based on UE's history and/or UE's location if known.

In optional step 3, the UE 1202 may receive a report request from the serving eNB1 1204 that triggers the UE to send a counting response, an MBSFN or unicast measurement report based on MII received from the UE. Alternatively, the network, e.g., eNB1 1204, may trigger the UE 1202 to send MII, counting response, MBSFN or unicast measurement by sending a request once the eNB detects that the UE has entered the RRC CONNECTED state.

In step 4, the UE 1202 may autonomously, or in response to the report request of step 3, send a report which may include MII, a counting response, a MBSFN measurement report or a unicast measurement report. Alternatively, the UE 1202

In step 5, the serving eNB1 1204 determines that the UE 1202 should switch from broadcast to unicast reception mode of the group communication based on the report sent by the UE. For example, based on the information transmitted by the UE 1202, the serving eNB1 1204 may detect that the UE is at the boundary of the MBSFN area supporting the eMBMS service broadcasting the group communication. In step 6, the serving eNB1 1204 indicates to the UE 1202 to use the unicast channel for the group communication service.

In step 7, the UE 1202 indicates to the GCSE-AS 1206 that the UE 1202 has moved outside the eMBMS coverage area broadcasting the group communication. The indication may be provided through application signaling through the eNB1 1004 and the P-GW/S-GW 1016.

In step 8, the GSCE-AS 1206 sends an ACK to the UE 1202 through application signaling through the P-GW/S-GW 1216 and the eNB1 1204. In step 9, the UE 1202 receives the GC service data/media from the GCSE-AS via the unicast bearer through eNB1 1204.

In step 10, the UE 1202 is handed off from eNB1 1204 to eNB2 1208. The eNB2 1208, however, may not be an eNB of an MBSFN area supporting an eMBMS broadcast service broadcasting the group communication. Accordingly, in step 11, the UE 1202 receives the GC service data/media from GCSE-AS 1206 via the unicast bearer through eNB2 1208. In step 12, the UE 1202 stops monitoring the corresponding MTCH associated with the eMBMS service broadcasting the group communication and continues receiving SIBs.

BC-to-UC Switching with Anchor at Network Entity Other than GCSE-AS:

In the above BC-to-BC optimizations, the user plane switching anchor may be at the GCSE-AS. In optimization described below, the BM-SC or the MBMS-GW may be the switching anchor to simplify the GCSE-AS. "Switching anchor" corresponds to the network entity that is aware of the use of one or both of an eMBMS bearer and a unicast bearer to send group call data. When BC-to-UC switching of a group communication with a UE is needed, the UE sends a request to the BM-SC to receive data/media from the BM-SC via unicast bearer. In these optimizations, existing BM-SC based BC-to-UC fallback mechanisms can be reused for group communication. The switching decision procedure may be the same as either of the above BC-to-BC optimizations of FIGS. 11 and 12.

In cases where the GCSE-AS is the switching anchor, the GCSE-AS sends group call data to either or both of the BM-SC and the P-GW. In cases where the BM-SC is the switching anchor, the BM-SC receives group call data from the GCSE-AS. The BM-SC decides to send the data through eMBMS bearer or P-GW or both. The BM-SC, in addition to serving as the anchor, also serves as a unicast fall back server. In cases where the MBMS-GW is the switching anchor, the BM-SC receives group call data from the GCSE-AS. The MBMS-GW receives group call data from the BM-SC. The MBMS-GW sends the group call data through multicast IP. The eNB joins multicast group to receive the data and send it through eMBMS bearer and/or the UE also joins the multicast group to receive the group call data through a unicast bearer.

Figure 13:
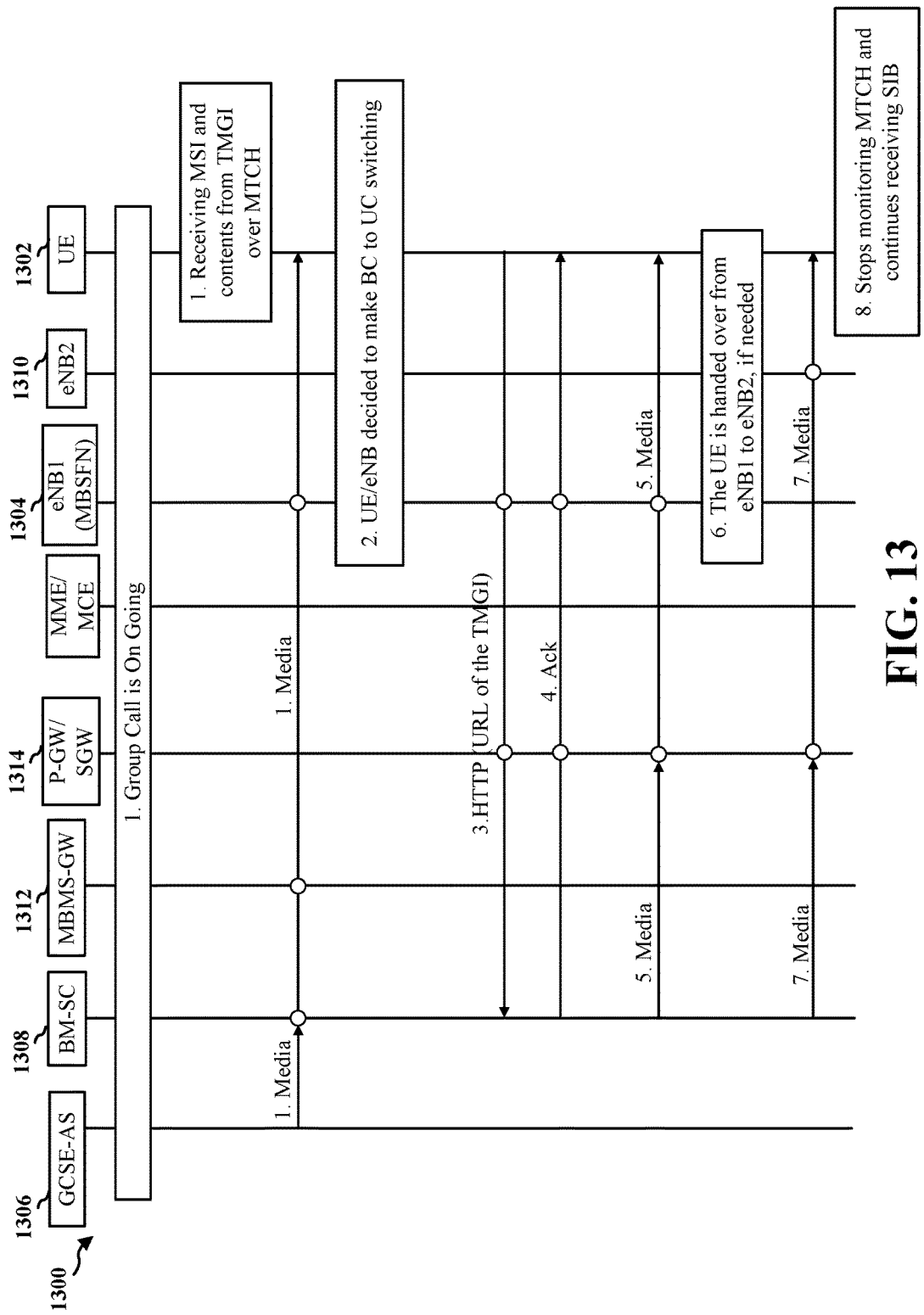
FIG. 13 is a call flow diagram illustrating a make-before-break solution for maintaining service continuity when moving out of eMBMS coverage with an anchor at the BM-SC.

BC-to-UC Switching with Anchor at BM-SC:

FIG. 13 is a call flow diagram 1300 illustrating a make-before-break solution for maintaining service continuity when a UE is moving out of eMBMS coverage when an anchor is at the BM-SC.

In step 1 the group communication call via an eMBMS service is ongoing. The UE 1302 is being served by eNB1 1304 of an MBSFN area supporting the eMBMS service broadcasting the group communication. The UE 1302 receives the group communication service data/media from the content provider, e.g., the GCSE-AS 1306, via an eMBMS bearer service. The data/media is received at the UE 1302 through signaling from the GCSE-AS 1306 to the BM-SC 1308, to the MBMS-GW 1312 to the eNB1 1304.

In step 2, the UE 1302 or serving eNB1 1304 decides to switch from BC to UC reception mode of the group communication. The switching decision procedure may be made in accordance with any of the above described optimizations. For example, the decision may be entirely UE based, as described with respect to FIG. 10 and possibly with one or more of the assistance information also described. The decision may be network based with assistance from a UE, as described with respect to FIG. 11, or fully network based as described with respect to FIG. 12.

In step 3, instead of sending an indication to the GCSE-AS 1306, as shown in step 4 of FIG. 10 and step 7 of FIGS. 11 and 12, the UE 1302 connects to the URL associated with the TMGI of the eMBMS service broadcasting the group communication. The connection may be made through the eNB1 1304 and the P-GW/S-GW 1314. The URL may be derived during eMBMS registration to the BM-SC 1308. The UE 1302 may activate a dedicated EPS bearer to carry the data/media. In step 4, the BM-SC 1308 acknowledges the request via signaling through the P-GW/S-GW 1314 and the eNB1 1304.

In step 5, data/media is sent from the BM-SC 1308 to the UE 1302 over unicast. In step 6, the UE 1302 is handed over from eNB1 1304 to eNB2 1310. In step 7, the UE 1302 receives the GC service data/media from the BM-SC 1308 via a unicast bearer through eNB2 1310. In step 8, the UE 1302 stops monitoring the MTCH associated with the eMBMS service, but continues receiving SIBs.

In another optimization, the UE may be enhanced to support M1 interface protocol to receive data/media from MBMS-GW directly.

BC-to-UC Switching with Anchor at MBMS-GW:

With reference to FIG. 8, in this optimization, a UE 804 is enhanced to support the M1 interface 806, including general packet radio service (GPRS) tunneling protocol (GTP) and SYNC protocols. When BC-to-UC switching is needed, the UE 804 activates a dedicated EPS bearer for data/media transmission, if needed, and sends IPv4 IGMP Join or IPv6 MLD message to the MBMS-GW 808. Then, the MBMS-GW 808 sends the data/media packets to the UE 804 following the M1 protocol. The multicast IP address of the TMGI on the MBMS-GW 808 may be sent to the UE 804 in MCCH. A security mechanism is provided for the MBMS-GW 808 to safely receive IP multicast requests from the UE 804.

BC-to-BC Switching Scenario:

As previously described with reference to FIG. 9B, in a BC-to-BC scenario a UE may move from a first eMBMS cell to a second eMBMS cell. The first eMBMS cell and the second eMBMS cell may be part of the same eMBMS service area or they may be part of different eMBMS service areas. In one possible scenario, a same TMGI for the group call is served by both MBSFN area 1 and MBSFN area 2, which are included in the same MBMS service area identified by the same SAI. In another possible scenario, a same TMGI for the group call is served by both MBSFN area 1 and MBSFN area 2, which are included in the same MBMS service area identified by different SAIs, e.g., MBSFN 1 in SAI1 and MBSFN 2 in SAI2. In yet another possible scenario, a same TMGI for the group call is served by both MBSFN area 1 and MBSFN area 2, which are included in the different MBMS service areas identified by different SATs, e.g., MBSFN 1 in SAI1 and MBSFN 2 in SAI2.

BC-to-BC Across Different MBSFN Areas:

When a UE moves from a first MBSFN area 1 supporting an eMBMS service of interest, to a second MBSFN area 2 that also supports the service of interest, the UE may initially switch to unicast before moving to another MBSFN area using any of the BC-to-UC procedures described above. Once the UE fully enters the second MBSFN area 2, the UE may switch back to broadcast. This procedure allows seamless transition from one MBSFN area to another.

Neighbor Cell does not Support MBMS Services of Interest:

SIB15 only provides frequency level information to a UE. When a same frequency is used for different purposes, such as shown in FIGS. 9A and 9B, SIB15 does not provide sufficient information for a UE to select a cell that supports the UE's service of interest. Accordingly, a UE in idle mode may reselect to a cell which does not have its desired TMGI. However, the serving eNB knows the services of each neighbor cell. Accordingly, for the two special cases of BC-to-BC switching shown in FIG. 9A and FIG. 9B, the MCE/eNB may send a MBSFN RSRP/RSRQ/SINR/BLER threshold to the UE. When the UE detects MBSFN RSRP/RSRQ/SINR is below the threshold received from eNB/MCE, the UE enters RRC CONNECTED mode. The UE then sends MBMS interest indication with a TMGI (or TMGI list) parameter corresponding to the service of interest, to the serving eNB. Based on the TMGI parameter included in the MBMS interest indication and the serving eNB's knowledge of services supported by neighboring cells, the serving eNB hands over the UE to the a cell that supports the TMGI.

Figure 14:
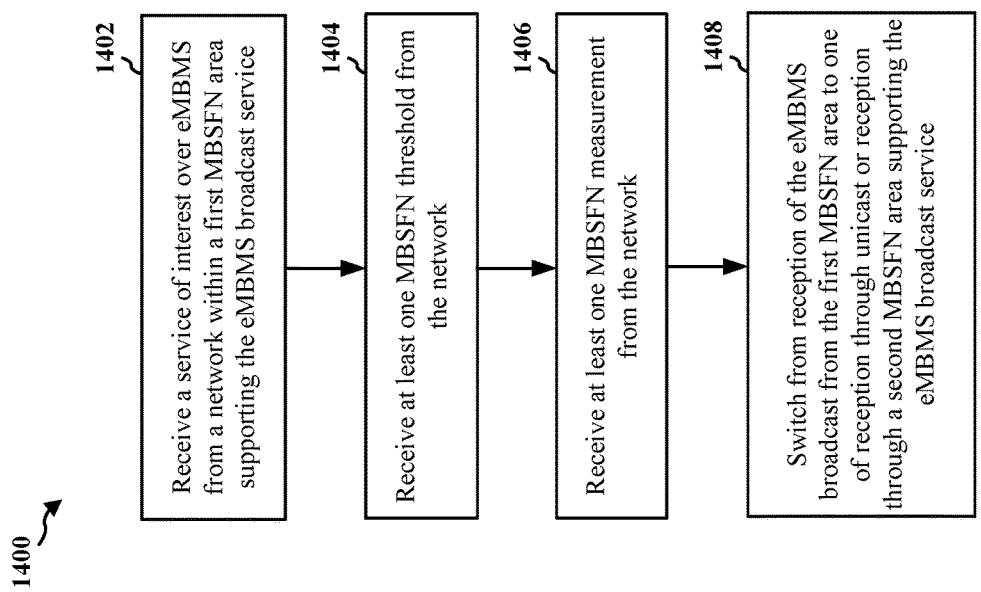
FIG. 14 is a flow chart of a method of maintaining continuity of reception of a service of interest at a UE, wherein the service of interest is available over eMBMS broadcast service and unicast.

FIG. 14 is a flow chart 1400 of a method of maintaining continuity of reception of a service of interest at a UE, wherein the service of interest is available over eMBMS broadcast service and unicast. The method may be performed by a UE. At step 1402, the UE receives the service of interest over eMBMS from a network within a first MBSFN area supporting the eMBMS broadcast service.

At step 1404, the UE receives at least one MBSFN threshold from the network.

At step 1406, the UE receives at least one MBSFN measurement from the network.

At step 1408, the UE switches from reception of the eMBMS broadcast from the first MBSFN area to one of reception through unicast, or reception through a second MBSFN area supporting the eMBMS broadcast service. Switching may be performed in accordance with any of the call flow diagrams of FIGS. 10, 11, 12 and 13. Switching may be based on the at least one MBSFN threshold and the at least one MBSFN measurement. The at least one MBSFN threshold may include one or more of a MBSFN RSRP threshold, a MBSFN RSRQ threshold, a MBSFN SINR threshold and a MCH BLER threshold. The at least one MBSFN measurement may include a corresponding one of a MBSFN RSRP measurement, a MBSFN RSRQ measurement, a MBSFN SINR measurement and a MCH BLER measurement.

In BC-to-UC switching scenarios, a first MBSFN threshold may correspond to a switching-preparation threshold. In this case, switching from reception of the eMBMS broadcast from the first MBSFN area includes the UE switching to an RRC CONNECTED state when the at least one MBSFN measurement satisfies the switching-preparation threshold and the UE is in an RRC IDLE state.

A second MBSFN threshold may correspond to a switching-initiation threshold. In this case, switching from reception of the eMBMS broadcast from the first MBSFN area further includes, after switching to the RRC CONNECTED state, requesting delivery of the service of interest over a unicast channel from a network element of the network when the at least one MBSFN measurement satisfies the switching-initiation threshold. The network element may include an application server, a BM-SC or a MBMS-GW. In the case of an application server, delivery of the service of interest may be requested by sending an indication to the application server. For a BM-SC delivery of the service of interest may be requested by connecting to a URL of a TMGI corresponding to the service of interest.

For a MBMS-GW, delivery of the service of interest maybe requested by sending an IP multicast joining message to the MBMS-GW. Furthermore, in case of a MBMS-GW, a dedicated EPS bearer may be activated for transmission of the eMBMS broadcast service if the UE does not have a suitable EPS bearer for this purpose. Also, the UE may receive the MBMS-GW multicast address and related GTP parameters of the TMGI from the network. A security mechanism may be implemented for the MBMS-GW to accept the IP multicast join message from the UE.

In a BC-to-BC switching scenario, where the UE moves from one MBSFN area to another MBSFN area that provides the service of interest, the UE may switch to unicast prior to moving to the other MBSFN area. A switch to unicast may be performed in accordance with any of the call flow diagrams of FIGS. 10, 11, 12 and 13. In this case, switching from reception of the eMBMS broadcast from the first MBSFN area may include requesting delivery of the service of interest over a unicast channel from a network element when a MBSFN measurement satisfies both a switching-preparation threshold and a switching-initiation threshold. After switching to unicast, the method further includes detecting sufficient eMBMS coverage at the UE, from a network within the second MFSFN area supporting the eMBMS broadcast service. Detection of sufficient eMBMS coverage may be based on MBSFN measurements such as MBSFN RSRP, MBSFN RSRQ and MCH BLER, or MBMS coverage area information such as the geographic border of MBMS coverage provided through pre-configuration or signaling from the network. If sufficient eMBMS coverage is detected, the UE switches from unicast to broadcast reception through the second MBSFN area supporting the eMBMS broadcast service.

In another BC-to-BC scenario, where a neighbor cell does not support the eMBMS broadcast of the service of interest, the UE may switch to an RRC CONNECTED state when a MBSFN measurement satisfies a switching-preparation threshold and the UE is in an RRC IDLE state. The switching-preparation threshold in this case may correspond to the switching-preparation threshold describe above for the BC-to-UC switching scenarios. The UE may then send to a serving eNB within the first MBSFN area, at least one of a MBMS interest indication with a TMGI corresponding to the service of interest, and/or SAI list corresponding to the service of interest. Based on the information sent by the UE, the serving eNB determines a neighboring cell within the second MBSFN area to hand over the UE to for continued reception of the service of interest The UE performs handover to the neighboring cell based on signals received from the eNB.

Figure 15:
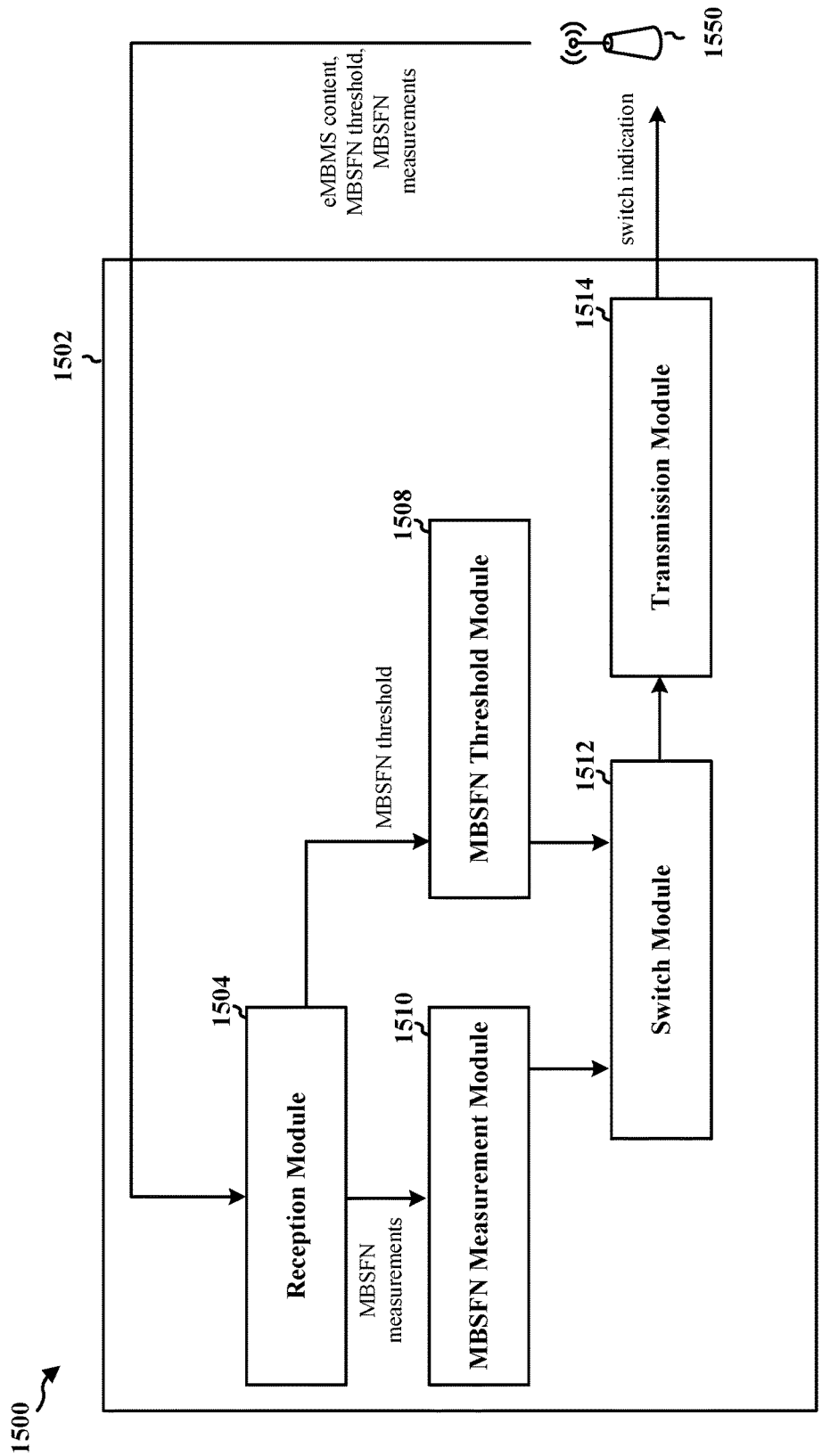
FIG. 15 is a conceptual data flow diagram illustrating the data flow between different modules/means/components in an exemplary apparatus that implements the flow chart of FIG. 14.

FIG. 15 is a conceptual data flow diagram 1500 illustrating the data flow between different modules/means/components in an exemplary apparatus 1502 that maintains continuity of reception of a service of interest available over eMBMS broadcast service and unicast. The apparatus may be a UE. The apparatus 1502 includes a reception module 1504, a MBSFN threshold module 1508, and a MBSFN measurement module 1510, a switch module 1512 and a transmission module 1514.

The reception module 1504 receives signals from a network element 1550, e.g., base station, of a network within a first MFSFN area supporting the eMBMS broadcast service that is broadcasting the service of interest to the UE. The signals may correspond to, or provide information related to, one or more of eMBMS broadcast content related to the service of interest, MBSFN thresholds, and MBSFN measurements. The reception module 1504 provides the MBSFN threshold signals to the MBSFN threshold module 1508, and the MBSFN measurement signals to the MBSFN measurement module 1510.

The MBSFN threshold module 1508 processes the received threshold signals to provide thresholds to the switch module 1512. Likewise, the MBSFN measurement module 1510 processes the MBSFN measurement signals to provide measurements to the switch module 1512. The switch module 1512 switches from reception of the eMBMS broadcast from the first MBSFN area to one of reception through unicast or reception through a second MBSFN area supporting the eMBMS broadcast service based on the at least one MBSFN threshold and the at least one MBSFN measurement. The transmission module 1514 may output a signal to the network element 1550 corresponding to a switch in reception. For example, the signal may initiate and/or include information for performing a switch from reception by broadcast to reception by unicast, or a switch from reception by broadcast through a first MBSFN area to reception by broadcast through a second MBSFN area, or a switch from reception by broadcast through a current serving cell to reception by broadcast through a neighboring cell.

The apparatus may include additional modules that perform steps of the algorithm in the aforementioned call flow diagram of FIG. 10 and the flow chart of FIG. 14. As such, steps in the aforementioned call flow diagram of FIG. 10 and flow chart of FIG. 14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
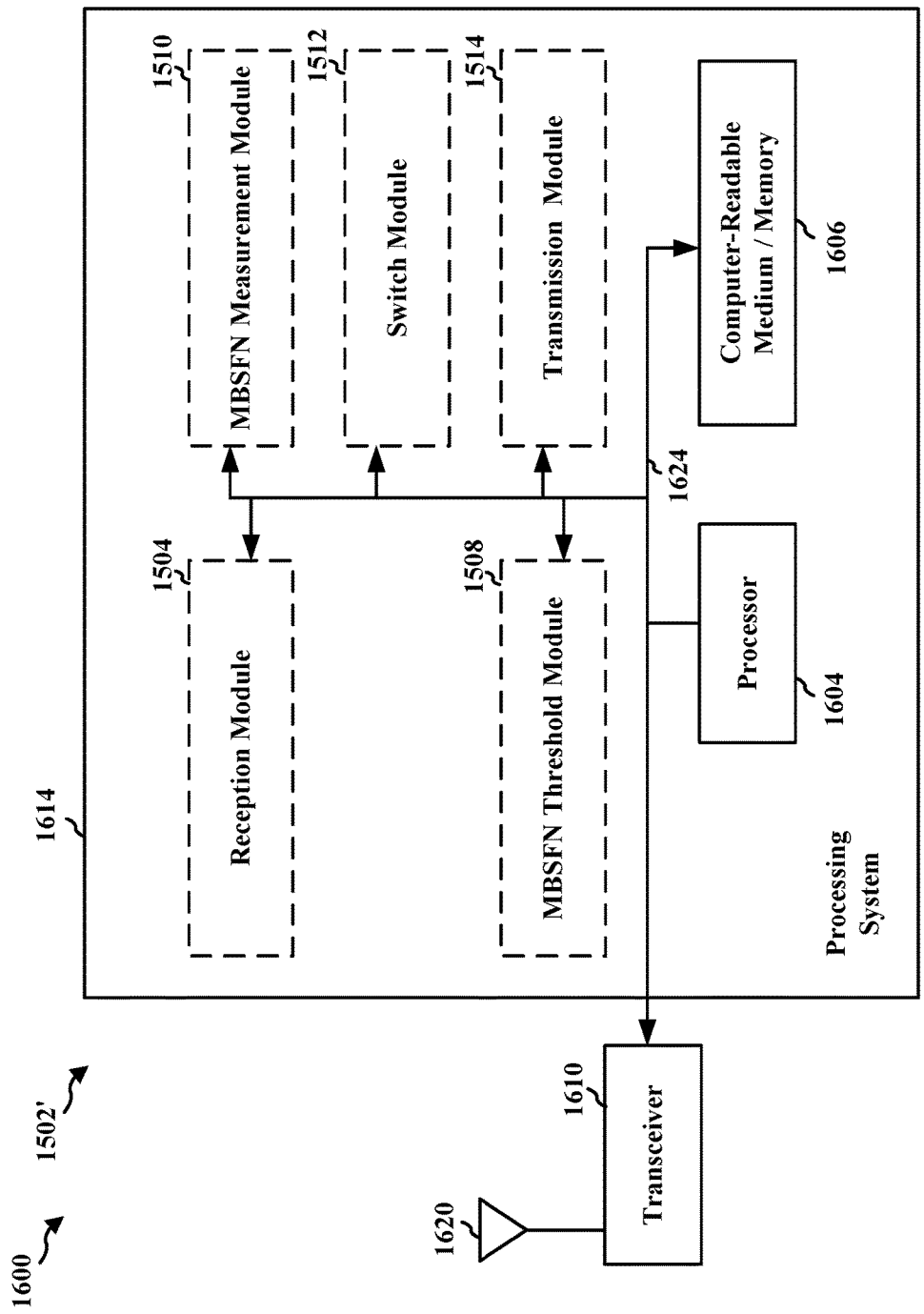
FIG. 16 is a diagram illustrating an example of a hardware implementation for an apparatus employing a processing system apparatus that implements the flow chart of FIG. 14.

FIG. 16 is a diagram 1300 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1504, 1508, 1510, 1512, 1514 and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception module 1514. In addition, the transceiver 1610 receives information from the processing system 1614, specifically the transmission module 1514, and based on the received information, generates a signal to be applied to the one or more antennas 1620.

The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system further includes at least one of the modules 1504, 1508, 1510, 1512, and 1514. The modules may be software modules running in the processor 1604, resident/stored in the computer readable medium/memory 1606, one or more hardware modules coupled to the processor 1604, or some combination thereof. The processing system 1614 may be a component of the UE 650 and may include the memory 660 and/or at least one of the TX processor 668, the RX processor 656, and the controller/processor 659.

In one configuration, the apparatus 1502/1502' for wireless communication includes means for receiving a service of interest over eMBMS from a network within a first MBSFN area supporting the eMBMS broadcast service; means for receiving at least one MBSFN threshold from the network; means for receiving at least one MBSFN measurement from the network; and means for switching from reception of the eMBMS broadcast from the first MBSFN area to one of reception through unicast or reception through a second MBSFN area supporting the eMBMS broadcast service, based on the at least one MBSFN threshold and the at least one MBSFN measurement.

The aforementioned means may be one or more of the aforementioned modules of the apparatus 1502 and/or the processing system 1614 of the apparatus 1502' configured to perform the functions recited by the aforementioned means. As described supra, the processing system 1614 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

In one aspect, a UE for maintaining continuity of reception of a service of interest includes a memory and at least one processor coupled to the memory. The service of interest is available over eMBMS broadcast service and unicast. The at least one processor of the UE is configured to: receive the service of interest over eMBMS from a network within a first MBSFN area supporting the eMBMS broadcast service; receive at least one MBSFN threshold from the network; receive at least one MBSFN measurement from the network; and switch from reception of the eMBMS broadcast from the first MBSFN area to one of reception through unicast or reception through a second MBSFN area supporting the eMBMS broadcast service, based on the at least one MBSFN threshold and the at least one MBSFN measurement. The processor may be further configured to perform steps of the algorithm in the aforementioned call flow diagram of FIG. 10 and the flow chart of FIG. 14.

In another aspect, a UE for maintaining continuity of reception of a service of interest includes a computer program product stored on a computer-readable medium and code executable on at least one processor. The service of interest is available over eMBMS broadcast service and unicast. The code stored on the UE, when executed on at least one processor, causes the at least one processor to: receive the service of interest over eMBMS from a network within a first MBSFN area supporting the eMBMS broadcast service; receive at least one MBSFN threshold from the network; receive at least one MBSFN measurement from the network; and switch from reception of the eMBMS broadcast from the first MBSFN area to one of reception through unicast or reception through a second MBSFN area supporting the eMBMS broadcast service, based on the at least one MBSFN threshold and the at least one MBSFN measurement. The code may further cause the at least one processor to perform steps of the algorithm in the aforementioned call flow diagram of FIG. 10 and the flow chart of FIG. 14.

Figure 17:
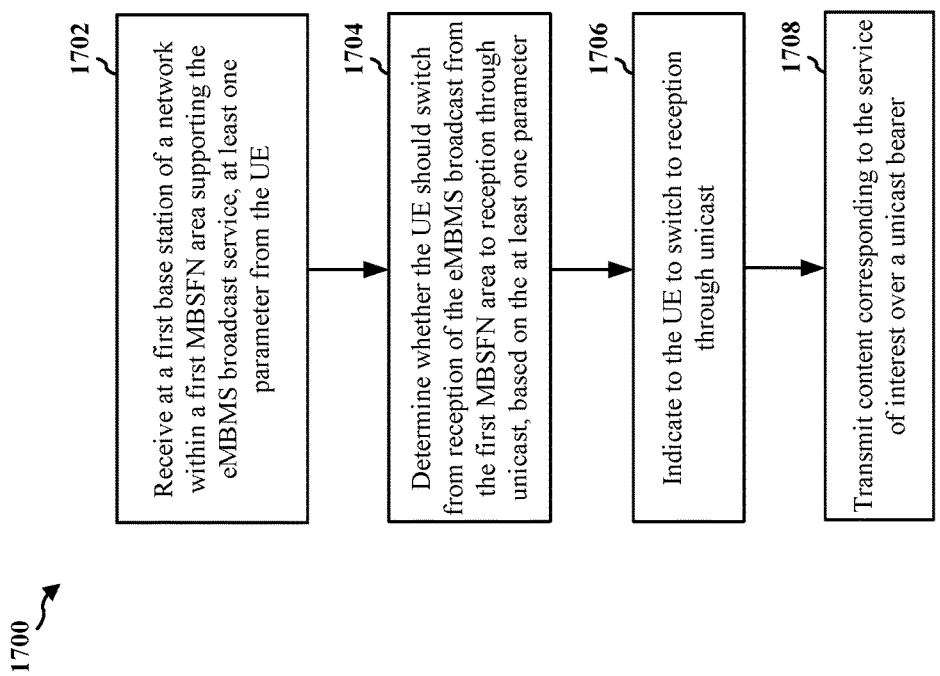
FIG. 17 is a flow chart of a method of maintaining continuity of reception of a service of interest at a UE, wherein the service of interest is available over eMBMS broadcast service and unicast.

FIG. 17 is a flow chart 1700 of a method of maintaining continuity of reception of a service of interest at a UE, wherein the service of interest is available over eMBMS broadcast service and unicast. The method may be performed by a network element, e.g., a base station or eNB, within a first MBSFN area supporting the eMBMS broadcast service.

At step 1702, the eNB receives at least one parameter from the UE. The parameter may be one or more of a MBMS interest indication (MID, a counting response, a MBSFN measurement report, and a unicast measurement report. In one implementation, the eNB sends a trigger signal to the UE to cause the UE to send the one or more parameters. In this case, the eNB detects whether the UE is in a connected state prior to sending the trigger signal. In another implementation, the eNB sends a signal to the UE to cause the UE to enter the connected state. The signal sent by the eNB may be a SIB indicating to the UE to enter the connected state, a counting request, measurement report request, or a paging message. Once in the connected state, the UE sends the one or more parameters.

At step 1704, the eNB determines whether the UE should switch from reception of the eMBMS broadcast from the first MBSFN area to reception through unicast, based on the at least one parameter. For example, when the parameter from the UE is one or more of unicast measurement reports or MBSFN measurement reports, the eNB may process the measurements in the reports to detect that the UE is at the boundary of the first MBSFN area. When the parameter from the UE is a MIT, the eNB may process the MII to determine if the UE is interested in the service.

At step 1706, if the eNB determines that the UE should switch to unicast, the eNB indicates to the UE to switch to reception through unicast. Such indication may be through an RRC message, e.g., RRC Connection Reconfiguration. At step 1708, the eNB transmits content corresponding to the service of interest over a unicast channel.

Figure 18:
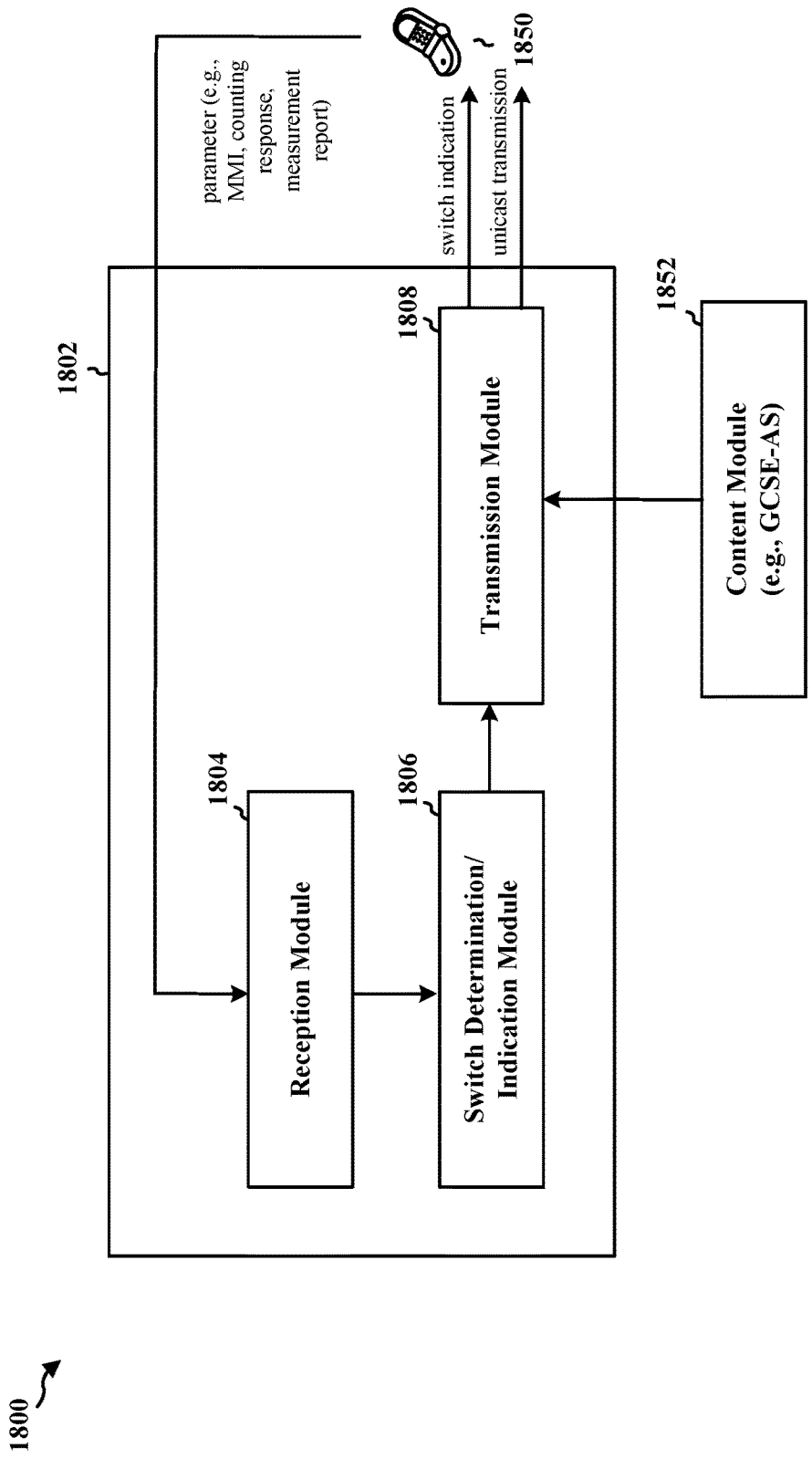
FIG. 18 is a conceptual data flow diagram illustrating the data flow between different modules/means/components in an exemplary apparatus that implements the flow chart of FIG. 17.

FIG. 18 is a conceptual data flow diagram 1800 illustrating the data flow between different modules/means/components in an exemplary apparatus 1802. The apparatus may be an eNB. The apparatus includes a reception module 1804, a switch determination/indication module 1806 and a transmission module 1808.

The reception module 1804 receives at least one parameter from the UE. The switch determination/indication module 1806 determines whether the UE should switch from reception of the eMBMS broadcast from the first MBSFN area to reception through unicast, based on the at least one parameter and indicates to the UE to switch to reception through unicast. The transmission module 1808 transmits the switch indication from the switch determination/indication module 1806 to the UE.

The apparatus may include additional modules that perform steps of the algorithm in the aforementioned call flow diagrams of FIGS. 11-13, and the flow chart of FIG. 17. As such, steps in the aforementioned call flow diagrams of FIGS. 11-13 and the flow chart of FIG. 17 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 19:
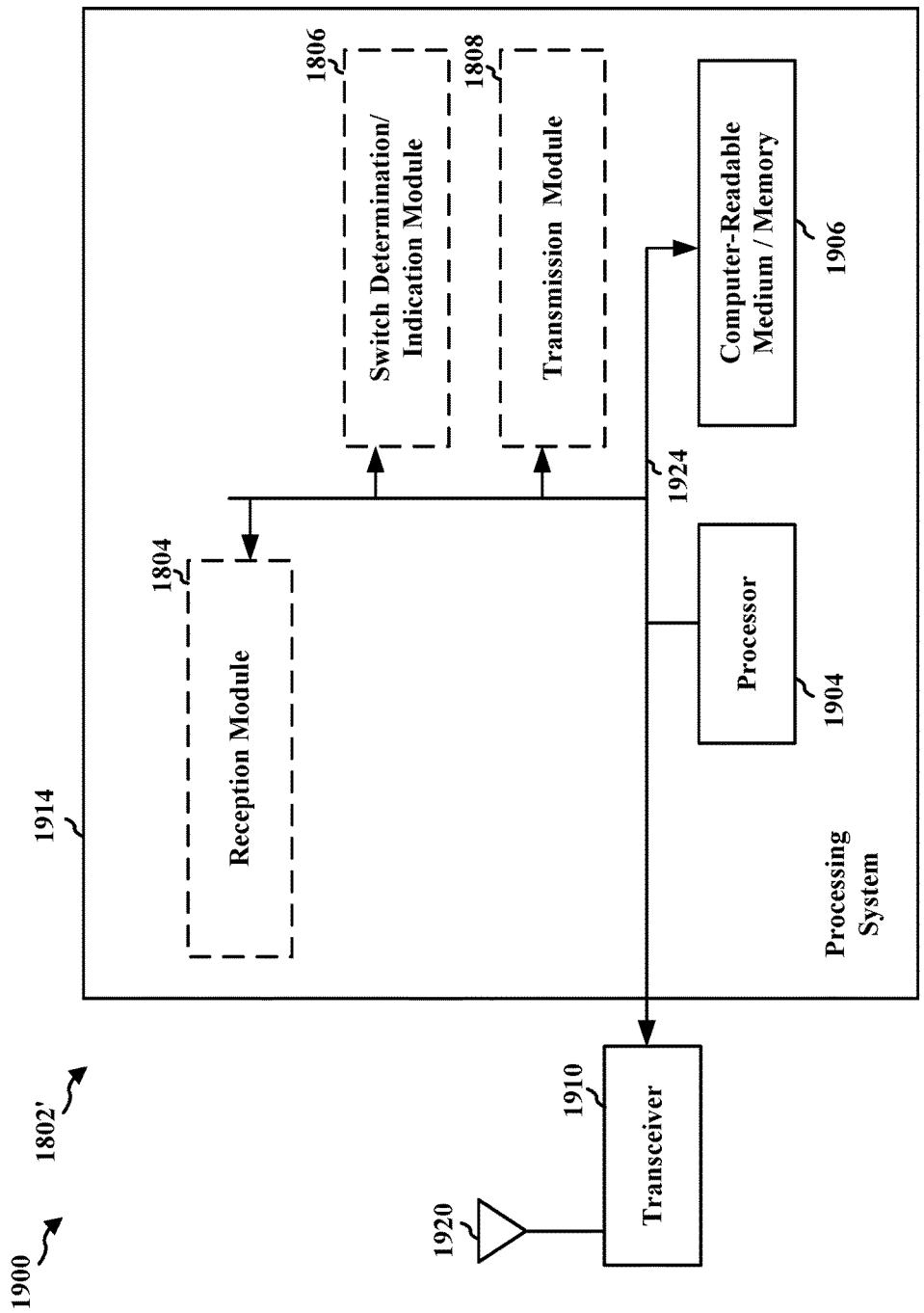
FIG. 19 is a diagram illustrating an example of a hardware implementation for an apparatus employing a processing system apparatus that implements the flow chart of FIG. 17.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware modules, represented by the processor 1904, the modules 1804, 1806, 1808, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception module 1804. In addition, the transceiver 1910 receives information from the processing system 1914, specifically the transmission module 1808, and based on the received information, generates a signal to be applied to the one or more antennas 1920.

The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system further includes at least one of the modules 1804, 1806, 1808. The modules may be software modules running in the processor 1904, resident/stored in the computer readable medium/memory 1906, one or more hardware modules coupled to the processor 1904, or some combination thereof. The processing system 1914 may be a component of the eNB 610 and may include the memory 676 and/or at least one of the TX processor 616, the RX processor 670, and the controller/processor 675.

In one configuration, the apparatus 1802/1802' for wireless communication includes means for receiving at least one parameter from the UE, means for determining whether the UE should switch from reception of the eMBMS broadcast from the first MBSFN area to reception through unicast, based on the at least one parameter, and means for indicating to the UE to switch to reception through unicast.

The aforementioned means may be one or more of the aforementioned modules of the apparatus 1802 and/or the processing system 1914 of the apparatus 1802' configured to perform the functions recited by the aforementioned means. As described supra, the processing system 1914 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

In one aspect, an apparatus for maintaining continuity of reception of a service of interest at a UE includes a memory and at least one processor coupled to the memory. The service of interest is available over eMBMS broadcast service and unicast, and the apparatus is part of a network within a first MBSFN area supporting the eMBMS broadcast service. The at least one processor of the apparatus is configured to: receive at least one parameter from the UE, determine whether the UE should switch from reception of the eMBMS broadcast from the first MBSFN area to reception through unicast, based on the at least one parameter, and indicate to the UE to switch to reception through unicast. The processor may be further configured to perform steps of the algorithm in the aforementioned call flow diagrams of FIGS. 11-13, and the flow chart of FIG. 17.

In another aspect, an apparatus for maintaining continuity of reception of a service of interest at a UE includes a computer program product stored on a computer-readable medium and code executable on at least one processor. The service of interest is available over eMBMS broadcast service and unicast, and the apparatus is part of a network within a first MBSFN area supporting the eMBMS broadcast service. The code stored in the apparatus, when executed on the at least one processor, causes the at least one processor to: receive at least one parameter from the UE, determine whether the UE should switch from reception of the eMBMS broadcast from the first MBSFN area to reception through unicast, based on the at least one parameter, and indicate to the UE to switch to reception through unicast. The code may further cause the at least one processor to perform steps of the algorithm in the aforementioned call flow diagrams of FIGS. 11-13, and the flow chart of FIG. 17.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of maintaining continuity of reception of a service of interest at a user equipment (UE), the service of interest available over evolved multimedia broadcast multicast service (eMBMS) broadcast service and unicast, said method comprising:
receiving the service of interest over eMBMS from a network within a first multicast broadcast single frequency network (MBSFN) area supporting the eMBMS broadcast service;
receiving at least one MBSFN threshold from the network;
measuring at least one MBSFN measurement based on the receiving the service of interest over the eMBMS from the network; and
switching from reception of the service of interest over the eMBMS from the first MBSFN area to one of reception through unicast or reception through a second MBSFN area supporting the eMBMS broadcast service, wherein the switching from reception over the eMBMS from the first MBSFN area to reception through unicast comprises switching to a radio resource control (RRC) CONNECTED state when the UE is in an RRC IDLE state based on the at least one MBSFN threshold and the at least one MBSFN measurement and requesting delivery of the service of interest over a unicast channel from a network element based on at least one other MBSFN threshold and the at least one MBSFN measurement.

2. The method of claim 1, wherein:
the at least one MBSFN threshold comprises one or more of a MBSFN receiver signal received power (MBSFN RSRP) threshold, a MBSFN reference signal received quality (MBSFN RSRQ) threshold, a MBSFN signal-to-interference-plus-noise ratio (MBSFN SINR) threshold, and a multicast channel of MBMS block error rate (MCH BLER) threshold; and
the at least one MBSFN measurement comprises one or more of a MBSFN RSRP measurement, a MBSFN RSRQ measurement, a MBSFN SINR measurement, and a MCH BLER measurement.

3. The method of claim 1, wherein the at least one MBSFN threshold comprises a switching-preparation threshold and the at least one other MBSFN threshold comprises a switching-initiation threshold that is different from the switching-preparation threshold.

4. The method of claim 1, wherein the at least one MBSFN measurement comprises a first MBSFN measurement when switching to the RRC CONNECTED state when the UE is in the RRC IDLE state based on the at least one MBSFN threshold and the at least one MBSFN measurement, and wherein the at least one MBSFN measurement comprises a second MBSFN measurement that is different from the first MBSFN measurement when requesting delivery of the service of interest over the unicast channel from the network element based on the at least one other MBSFN threshold and the at least one MBSFN measurement.

5. The method of claim 1, wherein the network element comprises an application server and requesting comprises sending an indication to the application server.

6. The method of claim 1, wherein the network element comprises a broadcast multicast service center (BM-SC) and requesting comprises connecting to a uniform resource locator (URL) of a temporary mobile group identity (TMGI) corresponding to the service of interest.

7. The method of claim 1, wherein the network element comprises a multimedia broadcast multicast service (MBMS) gateway (GW) (MBMS-GW) and requesting comprises sending an internet protocol (IP) multicast joining message to the MBMS-GW.

8. The method of claim 7, further comprising activating a dedicated evolved packet system (EPS) bearer for transmission of the eMBMS broadcast service if the UE does not have a suitable EPS bearer for this purpose.

9. The method of claim 7, further comprising receiving a MBMS-GW multicast address and related general packet radio service (GPRS) tunneling protocol (GTP) parameters of a TMGI from the network.

10. The method of claim 1, wherein switching from reception of the eMBMS broadcast from the first MBSFN area further comprises:
detecting sufficient eMBMS coverage at the UE, from a network within the second MBSFN area supporting the eMBMS broadcast service; and
switching from unicast to broadcast reception through the second MBSFN area supporting the eMBMS broadcast service.

11. The method of claim 1, wherein switching from reception of the eMBMS broadcast from the first MBSFN area further comprises:
sending to a serving eNB within the first MBSFN area, at least one of a MBMS interest indication (MII) with a temporary mobile group identity (TMGI) corresponding to the service of interest, and a service area identifier (SAI) list corresponding to the service of interest, wherein the UE is handed over to a cell that supports the eMBMS broadcast service based on at least one of the MII and the SAI list.

12. A user equipment (UE) for maintaining continuity of reception of a service of interest, the service of interest available over evolved multimedia broadcast multicast service (eMBMS) broadcast service and unicast, the UE comprising:
- means for receiving the service of interest over eMBMS from a network within a first multicast broadcast single frequency network (MBSFN) area supporting the eMBMS broadcast service;
- means for receiving at least one MBSFN threshold from the network;
- means for measuring at least one MBSFN measurement based on receiving the service of interest over the eMBMS from the network; and
- means for switching from reception of the service of interest over the eMBMS from the first MBSFN area to one of reception through unicast or reception through a second MBSFN area supporting the eMBMS broadcast service, wherein the means for switching reception is configured to switch the UE to a radio resource control (RRC) CONNECTED state when the UE is in an RRC IDLE state and the switch is to reception through unicast based on the at least one MBSFN threshold and the at least one MBSFN measurement and request delivery of the service of interest over a unicast channel from a network element based on at least one other MBSFN threshold and the at least one MBSFN measurement.

13. The UE of claim 12, wherein:
the at least one MBSFN threshold comprises one or more of a MBSFN receiver signal received power (MBSFN RSRP) threshold, a MBSFN reference signal received quality (MBSFN RSRQ) threshold, a MBSFN signal-to-interference-plus-noise ratio (MBSFN SINR) threshold, and a multicast channel of MBMS block error rate (MCH BLER) threshold; and
the at least one MBSFN measurement comprises one or more of a MBSFN RSRP measurement, a MBSFN RSRQ measurement, a MBSFN SINR measurement, and a MCH BLER measurement.

14. The UE of claim 12, wherein the at least one MBSFN threshold comprises a switching-preparation threshold and the at least one other MBSFN threshold comprises a switching-initiation threshold that is different from the switching-preparation threshold.

15. The UE of claim 12, wherein the at least one MBSFN measurement comprises a first MBSFN measurement when switching to the RRC CONNECTED state when the UE is in the RRC IDLE state based on the at least one MBSFN threshold and the at least one MBSFN measurement, and wherein the at least one MBSFN measurement comprises a second MBSFN measurement that is different from the first MBSFN measurement when requesting delivery of the service of interest over the unicast channel from the network element based on the at least one other MBSFN threshold and the at least one MBSFN measurement.

16. The UE of claim 12, wherein the means for switching from reception of the eMBMS broadcast from the first MBSFN area is further configured to:
- detect sufficient eMBMS coverage at the UE, from a network within the second MBSFN area supporting the eMBMS broadcast service; and
- switch from unicast to broadcast reception through the second MBSFN area supporting the eMBMS broadcast service.

17. The UE of claim 12, wherein the means for is switching from reception of the eMBMS broadcast from the first MBSFN area is further configured to:
- send to a serving eNB within the first MBSFN area, at least one of a MBMS interest indication (MII) with a temporary mobile group identity (TMGI) corresponding to the service of interest, and a service area identifier (SAI) list corresponding to the service of interest
- wherein the UE is handed over to a cell that supports the eMBMS broadcast service based on at least one of the MII and the SAI list.

18. A user equipment (UE) for maintaining continuity of reception of a service of interest, the service of interest available over evolved multimedia broadcast multicast service (eMBMS) broadcast service and unicast, said UE comprising:
- a memory; and
- at least one processor coupled to the memory and configured to:
  - receive the service of interest over eMBMS from a network within a first multicast broadcast single frequency network (MBSFN) area supporting the eMBMS broadcast service;
  - receive at least one MB SFN threshold from the network;
  - measure at least one MBSFN measurement based on the reception of the service of interest over the eMBMS from the network; and
  - switch from reception of the service of interest over the eMBMS from the first MBSFN area to one of reception through unicast or reception through a second MBSFN area supporting the eMBMS broadcast service, wherein the switch from reception over the eMBMS from the first MBSFN area to reception through unicast comprises to switch to a radio resource control (RRC) CONNECTED state when the UE is in an RRC IDLE state based on the at least one MBSFN threshold and the at least one MBSFN measurement and to request delivery of the service of interest over a unicast channel from a network element based on the at least one other MBSFN threshold and the at least one MBSFN measurement.

19. The UE of claim 18, wherein:
the at least one MBSFN threshold comprises one or more of a MBSFN receiver signal received power (MBSFN RSRP) threshold, a MBSFN reference signal received quality (MBSFN RSRQ) threshold, a MBSFN signal-to-interference-plus-noise ratio (MBSFN SINR) threshold, and a multicast channel of MBMS block error rate (MCH BLER) threshold; and
the at least one MBSFN measurement comprises one or more of a MBSFN RSRP measurement, a MBSFN RSRQ measurement, a MBSFN SINR measurement, and a MCH BLER measurement.

20. The UE of claim 18, wherein the at least one MBSFN threshold comprises a switching-preparation threshold and the at least one other MBSFN threshold comprises a switching-initiation threshold that is different from the switching-preparation threshold.

21. The UE of claim 18, wherein the at least one MBSFN measurement comprises a first MBSFN measurement when switching to the RRC CONNECTED state when the UE is in an RRC IDLE state based on the at least one MBSFN threshold and the at least one MBSFN measurement, and wherein the at least one MBSFN measurement comprises a second MBSFN measurement that is different from the first MBSFN measurement when requesting delivery of the service of interest over the unicast channel from the network element based on the at least one other MBSFN threshold and the at least one MBSFN measurement.

22. The UE of claim 18, wherein the network element comprises an application server and to request comprises sending an indication to the application server.

23. The UE of claim 18, wherein the network element comprises a broadcast multicast service center (BM-SC) and to request comprises to connect to a uniform resource locator (URL) of a temporary mobile group identity (TMGI) corresponding to the service of interest.

24. The UE of claim 18, wherein the network element comprises a multimedia broadcast multicast service (MBMS) gateway (GW) (MBMS-GW) and to request comprises to send an internet protocol (IP) multicast joining message to the MBMS-GW.

25. The UE of claim 24, further comprising activating a dedicated evolved packet system (EPS) bearer for transmission of the eMBMS broadcast service if the UE does not have a suitable EPS bearer for this purpose.

26. The UE of claim 24, further comprising receiving a MBMS-GW multicast address and related general packet radio service (GPRS) tunneling protocol (GTP) parameters of a TMGI from the network.

27. The UE of claim 18, wherein the switch from reception of the eMBMS broadcast from the first MBSFN area further comprises to:
  detect sufficient eMBMS coverage at the UE, from a network within the second MBSFN area supporting the eMBMS broadcast service; and
  switch from unicast to broadcast reception through the second MBSFN area supporting the eMBMS broadcast service.

28. The UE of claim 18, wherein the switch from reception of the eMBMS broadcast from the first MBSFN area further comprises to:
  send to a serving eNB within the first MBSFN area, at least one of a MBMS interest indication (MII) with a temporary mobile group identity (TMGI) corresponding to the service of interest, and a service area identifier (SAI) list corresponding to the service of interest, wherein the UE is handed over to a cell that supports the eMBMS broadcast service based on at least one of the MII and the SAI list.

29. A non-transitory, computer-readable medium storing computer-executable code for maintaining continuity of reception of a service of interest by a user equipment (UE), the service of interest available over evolved multimedia broadcast multicast service (eMBMS) broadcast service and unicast, comprising code to:
  receive the service of interest over eMBMS from a network within a first multicast broadcast single frequency network (MBSFN) area supporting the eMBMS broadcast service;
  receive at least one MBSFN threshold from the network;
  measure at least one MBSFN measurement based on the reception of the service of interest over the eMBMS from the network; and
  switch from reception of the service of interest over the eMBMS from the first MBSFN area to one of reception through unicast or reception through a second MBSFN area supporting the eMBMS broadcast service, wherein the switch from reception over the eMBMS from the first MBSFN area to reception through unicast comprises to switch to a radio resource control (RRC) CONNECTED state when the UE is in an RRC IDLE state based on the at least one MBSFN threshold and the at least one MBSFN measurement and to request delivery of the service of interest over a unicast channel based on at least one other MBSFN threshold and the at least one MBSFN measurement.

* * * * *